(12) United States Patent
Deguchi et al.

(10) Patent No.: US 7,330,948 B2
(45) Date of Patent: Feb. 12, 2008

(54) METHOD FOR REMOTE COPY PAIR MIGRATION

(75) Inventors: Akira Deguchi, Yokohama (JP); Takashige Iwamura, Yokohama (JP); Kenta Ninose, Yokohama (JP); Hiroshi Arakawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 11/143,780

(22) Filed: Jun. 3, 2005

(65) Prior Publication Data
US 2006/0236048 A1  Oct. 19, 2006

(51) Int. Cl.
*G06F 12/16* (2006.01)
(52) U.S. Cl. .................... 711/162; 711/165
(58) Field of Classification Search .............. None
See application file for complete search history.

(56) References Cited

U.S. PATENT DOCUMENTS

| | | | | |
|---|---|---|---|---|
| 6,393,537 | B1 * | 5/2002 | Kern et al. ............... | 711/162 |
| 6,408,370 | B2 | 6/2002 | Yamamoto et al. | |
| 6,640,291 | B2 * | 10/2003 | Fujibayashi et al. ....... | 711/162 |
| 6,643,671 | B2 * | 11/2003 | Milillo et al. ............ | 707/204 |
| 6,728,736 | B2 * | 4/2004 | Hostetter et al. ......... | 707/204 |
| 6,938,137 | B2 * | 8/2005 | Fujibayashi et al. ....... | 711/162 |
| 7,149,859 | B2 * | 12/2006 | Fujibayashi ............... | 711/162 |
| 7,200,725 | B2 * | 4/2007 | Maruyama et al. ........ | 711/161 |
| 7,225,190 | B2 * | 5/2007 | Iwamura et al. ........... | 707/10 |
| 2003/0033494 | A1 * | 2/2003 | Fujibayashi et al. ....... | 711/162 |
| 2004/0068629 | A1 * | 4/2004 | Fujibayashi et al. ....... | 711/162 |
| 2005/0193180 | A1 * | 9/2005 | Fujibayashi .............. | 711/162 |
| 2005/0210078 | A1 * | 9/2005 | Maruyama et al. ........ | 707/202 |
| 2006/0031646 | A1 * | 2/2006 | Maruyama et al. ........ | 711/162 |
| 2006/0161721 | A1 * | 7/2006 | Iwamura et al. ........... | 711/100 |
| 2007/0050578 | A1 * | 3/2007 | Fujibayashi .............. | 711/162 |
| 2007/0113034 | A1 * | 5/2007 | Maruyama et al. ........ | 711/162 |

FOREIGN PATENT DOCUMENTS

JP        11-85408        3/1999

* cited by examiner

*Primary Examiner*—Kevin Verbrugge
(74) *Attorney, Agent, or Firm*—Mattingly, Stanger, Malur & Brundidge, P.C.

(57) ABSTRACT

During an asynchronous remote copy process for a plurality of asynchronous remote copy pairs, a copy of data in a migration source primary storage area is stored in a migration destination primary storage area, and the copy of data in the migration source primary storage area is also stored in a migration destination secondary storage area through a migration destination primary storage area or a migration source secondary storage area. Then, for an asynchronous remote copy pair established between the migration destination primary storage area and the migration destination secondary storage area together with the above-described asynchronous remote copy pairs, the asynchronous remote copy process is executed in such a method that a copy of writing data is stored in a plurality of secondary storage areas in accordance with the write request sequence issued by a computer. As such, an asynchronous remote copy pair between any two specific storage systems is migrated to be an asynchronous remote copy pair among any other two storage systems.

20 Claims, 25 Drawing Sheets

FIG. 5

422 PAIR CONFIGURATION TABLE

| SOURCE VOLUME ID | DESTINATION VOLUME ID | PAIR STATE | OTHER-END STORAGE SYSTEM ID | LOGICAL GROUP ID | TYPE |
|---|---|---|---|---|---|
| VOLUME 1 | VOLUME 2 | Duplex | STORAGE SYSTEM 2 | GROUP 1 | ASYNCHRONOUS |
| VOLUME 2 | VOLUME 4 | Duplex | STORAGE SYSTEM 2 | GROUP 2 | SYNCHRONOUS |
| ... | ... | ... | ... | ... | ... |

| LOGICAL GROUP ID | SEQ# |
|---|---|
| GROUP 1 | 5 |
| GROUP 2 | 10 |
| ... | |

FIG. 7

600 UPDATED DATA

| WRITE TIME | SEQ# | WRITE DATA | DESTINATION VOLUME ID | WRITE ADDRESS | DATA LENGTH | LOGICAL GROUP ID | DESTINATION STORAGE SYSTEM ID |
|---|---|---|---|---|---|---|---|

FIG. 8

424 MNCTG TABLE

| MNCTGID | LOGICAL GROUP ID | GROUP PLACEMENT STORAGE SYSTEM ID |
|---|---|---|
| MNCTG1 | GROUP 2 | STORAGE SYSTEM 2 |
| MNCTG2 | GROUP 4 | STORAGE SYSTEM 4 |
| ... | ... | ... |

DATA TRANSFER PROGRAM 722

UPDATED DATA RECEPTION PROGRAM 727

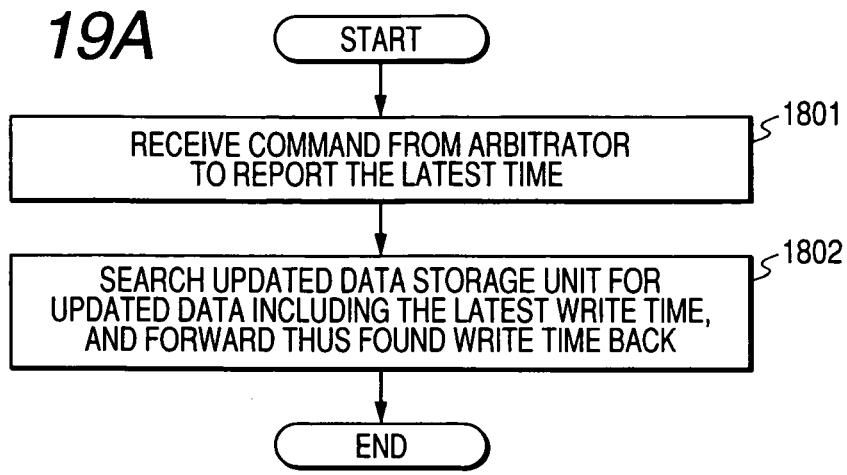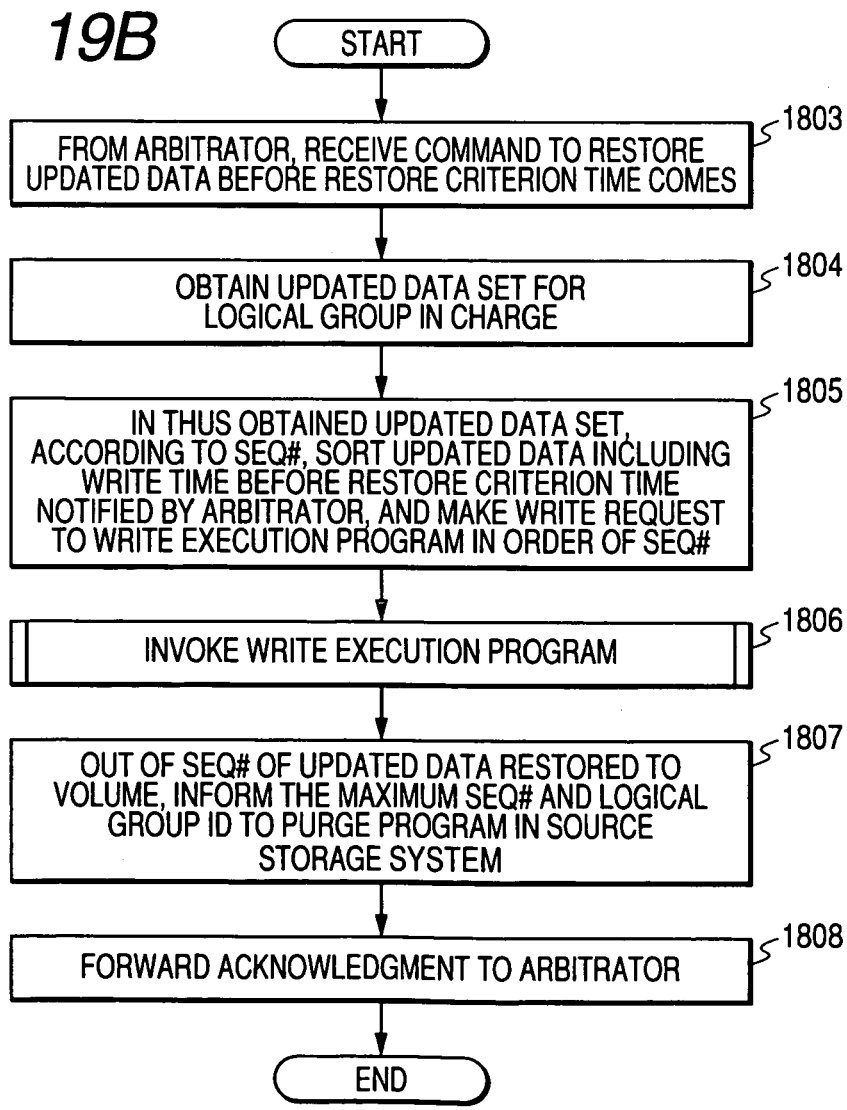

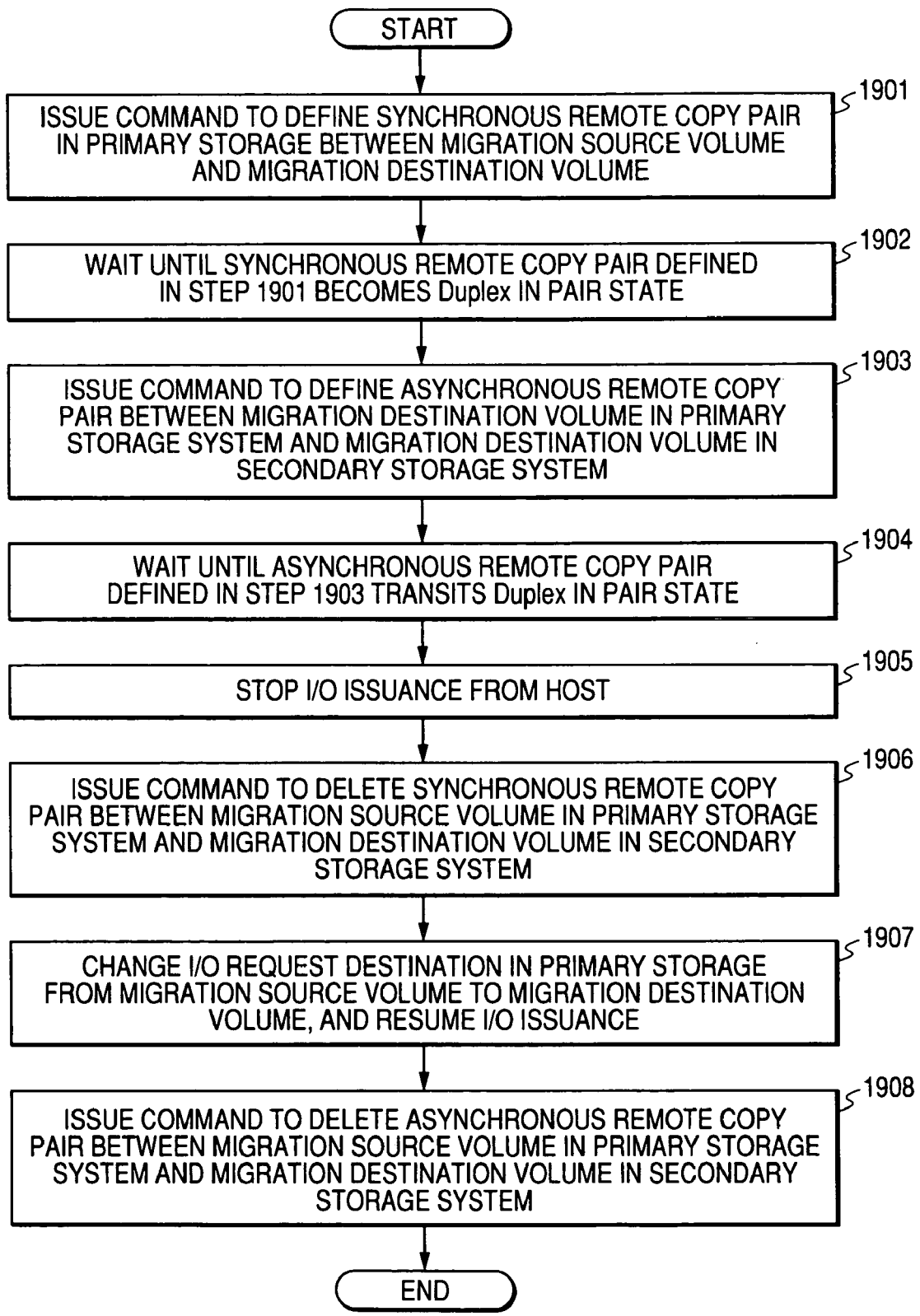

REMOTE COPY INFORMATION CHANGE PROGRAM 730

METHOD FOR REMOTE COPY PAIR MIGRATION

CROSS-REFERENCES TO RELATED APPLICATIONS

This application relates to and claims priority from Japanese Patent Application No. 2005-117679, filed on Apr. 15, 2005, the entire disclosure of which is incorporated herein by reference.

BACKGROUND

The present invention relates to an information processing system including a plurality of network-connected storage systems, and a data transfer technology.

In an information processing system including a storage system, if any failure occurs to the information processing system due to natural disaster exemplified by earthquakes or hurricanes, or power failure, data in the storage system may entirely or partially lost. Also, operations utilizing the information processing system may be stopped. As a possible solution for such problems, a storage system (hereinafter, referred to as destination storage system) is placed at some distance from another storage system that is in charge of operations (hereinafter, referred to as source storage system) so that data is to be written into both the source and destination storage systems. Such a dual-writing technology is referred to as remote copy.

The remote copy is classified into two modes of synchronous remote copy and asynchronous remote copy.

In the synchronous remote copy, every time a write request is issued to the source storage system, data is responsively written to both the source and destination storage systems. After such data dual-writing, an acknowledgment of write is issued. In such synchronous remote copy, the high identicalness of data is achieved between the source and destination storage systems. Accordingly, even if a failure occurs to the source storage system, consequential data loss can be minimized. There is a drawback, however, of lengthening a write response time with an increase of the distance between the source and destination storage systems.

In the asynchronous remote copy, when a write request is issued to the source storage system, the source storage system is responsively written with data. After such data writing, an acknowledgment of write is forwarded back to the source of the write request, and then the data is copied from the source storage system to the destination storage system. As such, the write response time is shorter compared with the synchronous remote copy. There also is a drawback, however, of easier and larger amount of data loss if a failure occurs to the source storage system compared with the synchronous remote copy.

The remote copy is defined to be applied between any arbitrary storage areas in a storage system. This is referred to as remote copy pair.

As to data transfer in the asynchronous remote copy, Patent Document 1 (JP-A-H11-85408) describes the technology of assuring the data-write-sequence consistency in a destination storage system as well as in a source storage system. In Patent Document 1, when a write request is accepted in the source storage system, data for writing is added with control information indicating the data writing sequence. Utilizing such control information, the destination storage system sorts the writing data transferred by the source storage system. The resulting writing data is then reflectively stored into the destination storage system in the sequence of data writing.

Patent Document 1 also describes the asynchronous remote copy between a primary site and a secondary site. The primary site includes a plurality of source storage systems, and a primary host computer (in the below, referred to as primary host) that makes accesses to these source storage systems. The secondary site includes a plurality of destination storage systems, and a secondary host computer (in the below, referred to as secondary host) that makes accesses to these destination storage systems. As such, in Patent Document 1, the technology of assuring the data-write-sequence consistency is also applicable to a case where the source and destination storage systems are each provided plurally.

SUMMARY

The issue here is that Patent Document 1 has no description about data migration during an asynchronous remote copy pair with the data-write-sequence consistency assured among a plurality of source and destination storage systems, i.e., partial or entire migration of an asynchronous remote copy pair being in progress between specific source and destination storage systems to any other source and destination storage systems.

The technology of such a remote copy pair migration is in demand in view of load balancing among the storage systems, maintenance inspection therein, and the like.

Therefore, in consideration thereof, a system, which enables remote copy pair migration in a computer system for remote copy between a primary site and a secondary site, is described.

The primary site is provided with: a first primary storage system including a plurality of first primary storage areas having a migration source primary storage area, and a first primary control unit for controlling the first primary storage areas; and a second primary storage system including a plurality of second primary storage areas having a migration destination primary storage area, and a second primary control unit for controlling the second primary storage areas. The secondary site is provided with: a first secondary storage system including a plurality of first secondary storage areas having a migration source secondary storage area, and a first secondary control unit for controlling the first secondary storage areas; and a second secondary storage system including a plurality of second secondary storage areas having a migration destination secondary storage area, and a second secondary control unit for controlling the second secondary storage areas.

Between the first primary storage areas having the migration source primary storage area and the second primary storage areas, and between the first secondary storage areas having the migration source secondary storage area and the second secondary storage areas, a plurality of asynchronous remote copy pairs are defined. In accordance with the sequence of write requests issued by a computer for the first primary storage areas having the migration source primary storage area and the second primary storage areas, the first and second primary control units and the first and second secondary control units execute an asynchronous remote copy process with respect to the asynchronous remote copy pairs. The process is so executed that a copy of writing data is stored in the first secondary storage areas having the migration source secondary storage area and the second secondary storage areas.

For remote copy pair migration, while the asynchronous remote copy process is executed for the asynchronous remote copy pairs, a copy of data in the migration source primary storage areas is stored into the migration destination primary storage areas, and the copy of data in the migration source primary storage areas is also stored into the migration destination secondary storage areas via either the second primary storage system or the first secondary storage system. As to the asynchronous remote copy pair defined between the migration destination primary storage area and the migration destination secondary storage area, and as to the above-described asynchronous remote copy pairs, the first and second primary control units and the first and second secondary control units execute the asynchronous remote copy process in accordance with the sequence of write requests issued by the computer for the first primary storage areas and the second primary storage areas so that a copy of writing data is stored in the first secondary storage areas and the second secondary storage areas. In such a method, the asynchronous remote copy pairs between the migration source primary storage areas and the migration source secondary storage areas are migrated to the asynchronous remote copy pairs between the migration destination primary storage areas and the migration destination secondary storage areas.

As such, during an asynchronous remote copy process with the data-write-sequence consistency assured among a plurality of source and destination storage systems, an asynchronous remote copy pair being in progress between specific source and destination storage systems can be partially or entirely migrated to any other source and destination storage systems.

BRIEF DESCRIPTION OF THE DRAWINGS

FIG. 5 is a diagram showing an exemplary PAIR configuration table;

FIG. 6 is a diagram showing exemplary SEQ# information;

FIG. 7 is a diagram showing exemplary updated data;

FIG. 8 is a diagram showing an exemplary MNCTG table;

FIG. 19 A and FIG. 19 B are diagrams showing an exemplary process to be executed by an MN restore program;

FIG. 22 is a flowchart showing an exemplary migration process for an asynchronous remote copy pair;

DESCRIPTION OF THE PREFERRED EMBODIMENTS

In the below, embodiments of the present invention are described. The following embodiments are described by way of example, and the present invention is not restricted thereto.

Moreover, each program described in the following embodiments comprises codes, each of which causes a computer or a storage system to execute a process or a step described in the following embodiments.

First Embodiment

Figure 1:
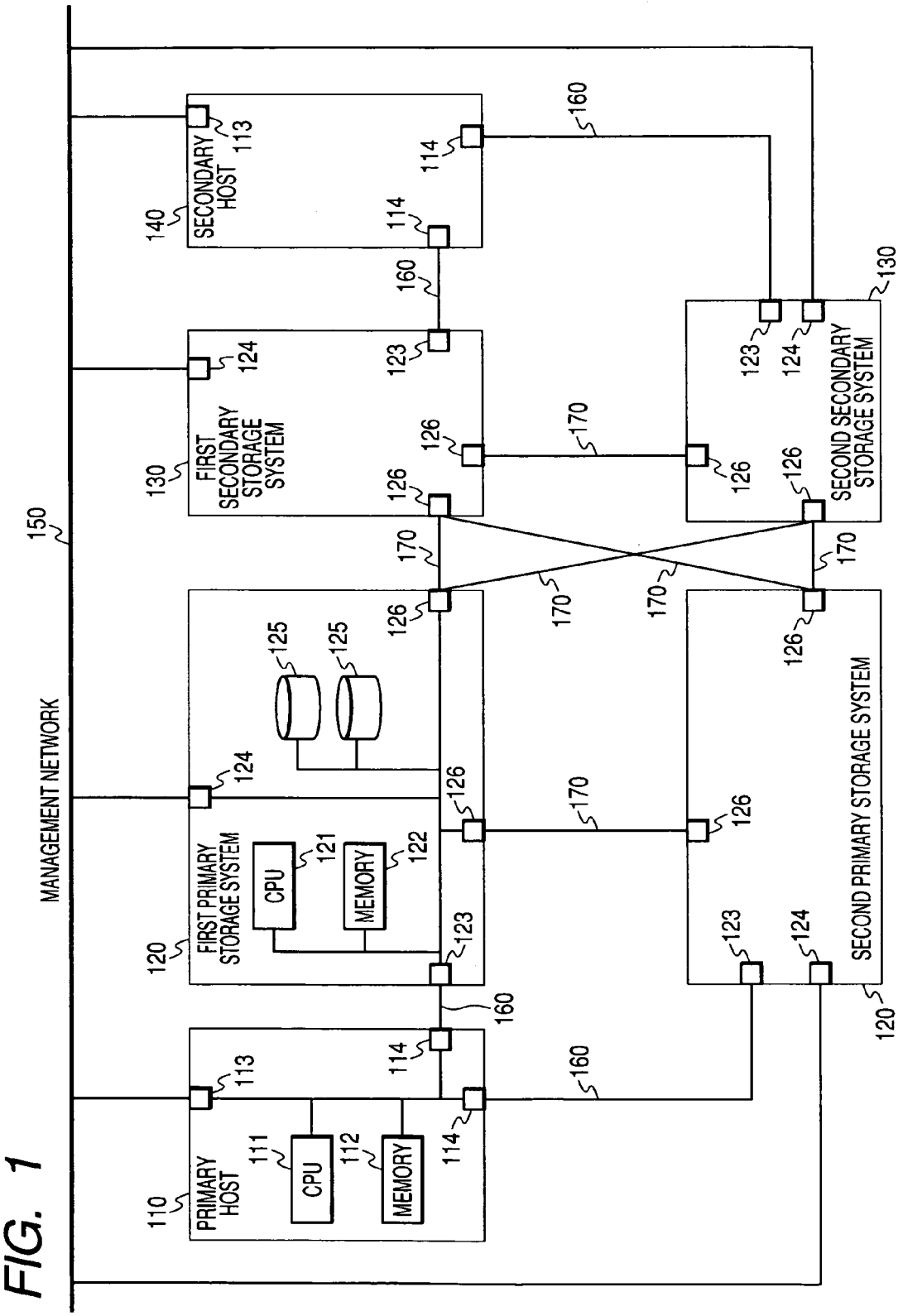
FIG. 1 is a diagram showing an exemplary information processing system to which the present invention is applied.

FIG. 1 shows an exemplary information processing system to which the present invention is applied.

The information processing system is provided with a primary site and a secondary site. The primary site includes a primary host 110, and a plurality of primary storage systems 120 (first and second primary storage systems). The secondary site includes a secondary host 140, and a plurality of secondary storage systems 130 (first and second secondary storage systems). A management network 150 is provided for connection among these components together, i.e., the primary host 110, the primary storage systems 120, the secondary host 140, and the secondary storage systems 130. Herein, the primary and secondary hosts 110 and 140 may be each provided plurally, and the number of primary and secondary storage systems 120 and 130 are not restricted to FIG. 1 example. Moreover, the information processing system may not include the management network 150, or the secondary host 140.

The primary and secondary hosts 110 and 140 have the similar hardware structure. In the below, the primary and secondary hosts 110 and 140 are simply referred to as host whenever there is no need to make a distinction there between.

The host is provided with: a CPU (Central Processing Unit) 111; memory 112; a management network interface 113 for connection with the management network 150; and Input/Output (I/O) interfaces 114 each for connection with a storage system. These components are connected to one another over an intra-system network.

The memory 112 stores software exemplified by OS (Operating System), middleware, application, and others. Thus the stored software is executed by the CPU 111. The host stores a part or entire data for use by the software to be executed by the CPU 111 to a storage device(s) 125 in the primary or secondary storage system 120 or 130.

The I/O interface 114 is used to make a request to storage systems for an I/O process such as data writing or reading. The I/O interface 114 in the primary host 110 is connected to the primary storage system 120 over a network 160, and the I/O interface 114 in the secondary host 140 is connected to the secondary storage system 130 over the network 160. The network 160 may be exemplified by Fibre Channel, ATM, or Ethernet, however, any other type of medium will do as long as it is capable of forwarding and receiving requests and replies for an I/O process between a host and a storage system. In the below, the requests for the I/O process are simply referred to as I/O requests.

The primary and secondary storage systems 120 and 130 have the similar hardware structure, and are simply referred to as storage system whenever there is no need to make a distinction there between.

The storage system is provided with: a CPU 121; memory 122; an I/O interface 123 for accepting the I/O requests from the host; a management network interface 124 for connection with the management network 150; one or more storage devices 125; and remote copy interfaces 126, those of which are connected to one another over an intra-system network.

The memory 122 stores programs for a remote copy process that will be described later, or for processing the I/O requests issued by the host. The programs are to be executed by the CPU 121.

The storage device 125 stores data for use by the software to be executed by the host. The storage device 125 may be exemplified by physical devices such as hard disk, magneto-optical disk, optical disk, and flash memory. This is not restrictive, and any other type of storage medium will do. Alternatively, with RAID (Redundant Arrays of Independent Disks) or others for higher reliability, a plurality of physical devices may be collectively handled as a single logical storage device, or the storage area of a logical or physical storage device may be divided to handle one of the resulting storage areas as a logical storage device. The logical storage device is referred to as volume.

The remote copy interface 126 is used for data transmission and reception in a remote copy process. In each of the primary storage systems 120, the remote copy interfaces 126 are connected to each corresponding remote copy interface 126 in the secondary storage systems 130 over a network 170. For a remote copy process for execution among the primary or secondary storage systems 120 or 130 that will be described later, the remote copy interfaces 126 in the primary storage systems 120 are connected also to each corresponding remote copy interface 126 in other primary storage systems 120 over the network 170. Similarly, the remote copy interfaces 126 in the secondary storage systems 130 are connected to each corresponding remote copy interface 126 in other secondary storage systems 130 over the network 170.

Note here that exemplified in FIG. 1 is a case where the primary storage systems 120 are each connected to all of the secondary storage systems 130 over the network 170. This is not necessary, and each of the primary storage systems 120 may be connected to any one of the secondary storage systems 130. The network 170 may be configured by a Fibre Channel, but this is not the only option.

Figure 2:
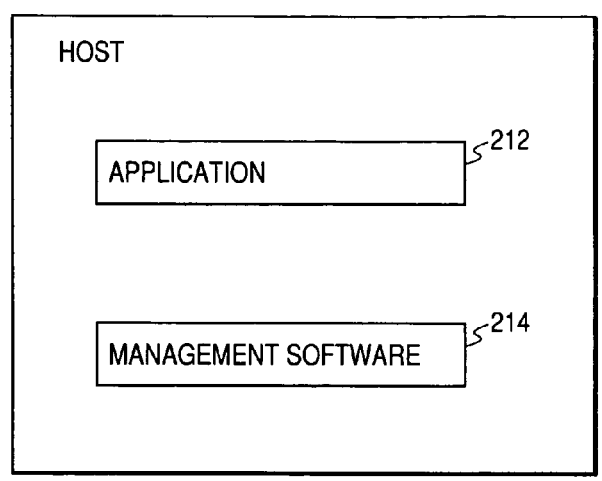
FIG. 2 is a diagram showing an exemplary structure of a host.

FIG. 2 is a diagram showing an exemplary software structure of the host. Because the primary and secondary hosts 110 and 140 have the similar software structure, no specific distinction is made therebetween for the following description. The software of FIG. 2 is stored in the memory 112 in the host for execution by the CPU 111.

The host includes an application program 212 such as database and Web server, and management software 214 for use to make various settings from the host to the storage system.

The application 212 is a program to be executed using data stored in a volume 442 in the storage system. For accessing the data in the volume 442, I/O requests including write requests or read requests are issued to the storage system.

Figure 3:
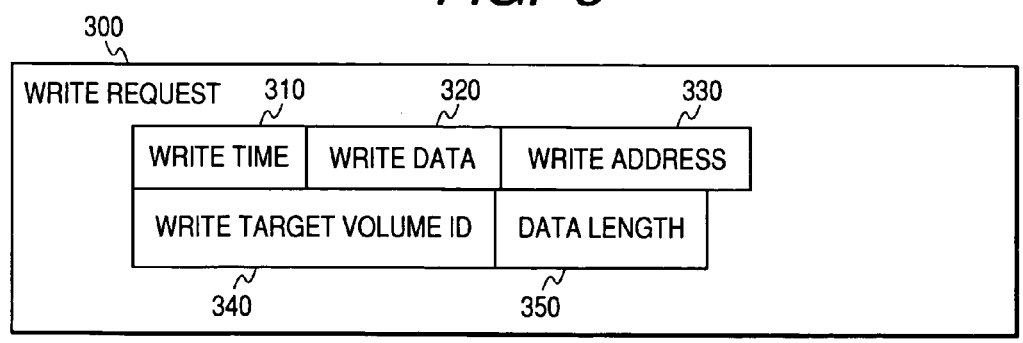
FIG. 3 is a diagram showing an exemplary write request.

FIG. 3 is a diagram showing an exemplary write request to be issued from the host to the storage system. A write request 300 issued by the host includes: a write time 310; write data 320; a write target volume ID 340 that is identification information for a write target volume; a write address 330 that indicates the write position in the write target volume; and a data length 350 of the write data.

Under normal circumstances, the primary host 110 connected to the primary storage systems 120 is in charge of operations. Accordingly, at the time of issuance of the write request 300 to the primary storage system 120, the primary host 110 provides the write request 300 with the write time 310. The write time 310 indicates the time when the write request 300 is issued. This write time 310 serves well when the primary storage system 120 is connected with a plurality of primary hosts 110. Using the write time 310 enables the primary storage system 120 to correctly grasp (ordering) the sequence of the write requests 300 issued by various many hosts 110. Herein, the secondary host 140 connected to the secondary storage system 130 is a standby host to take over the operations performed in the primary host 110 when any failure occurs to the primary host 110 or the primary storage system 120.

Referring back to FIG. 2, the management software 214 is a program for issuing commands to the storage system. The commands include those for definition or deletion of a remote copy pair, those for definition of a logical group 440 that will be described later, or those for definition of an MN consistency group that is used for assuring the data-write-sequence consistency over a plurality of storage systems.

Figure 4:
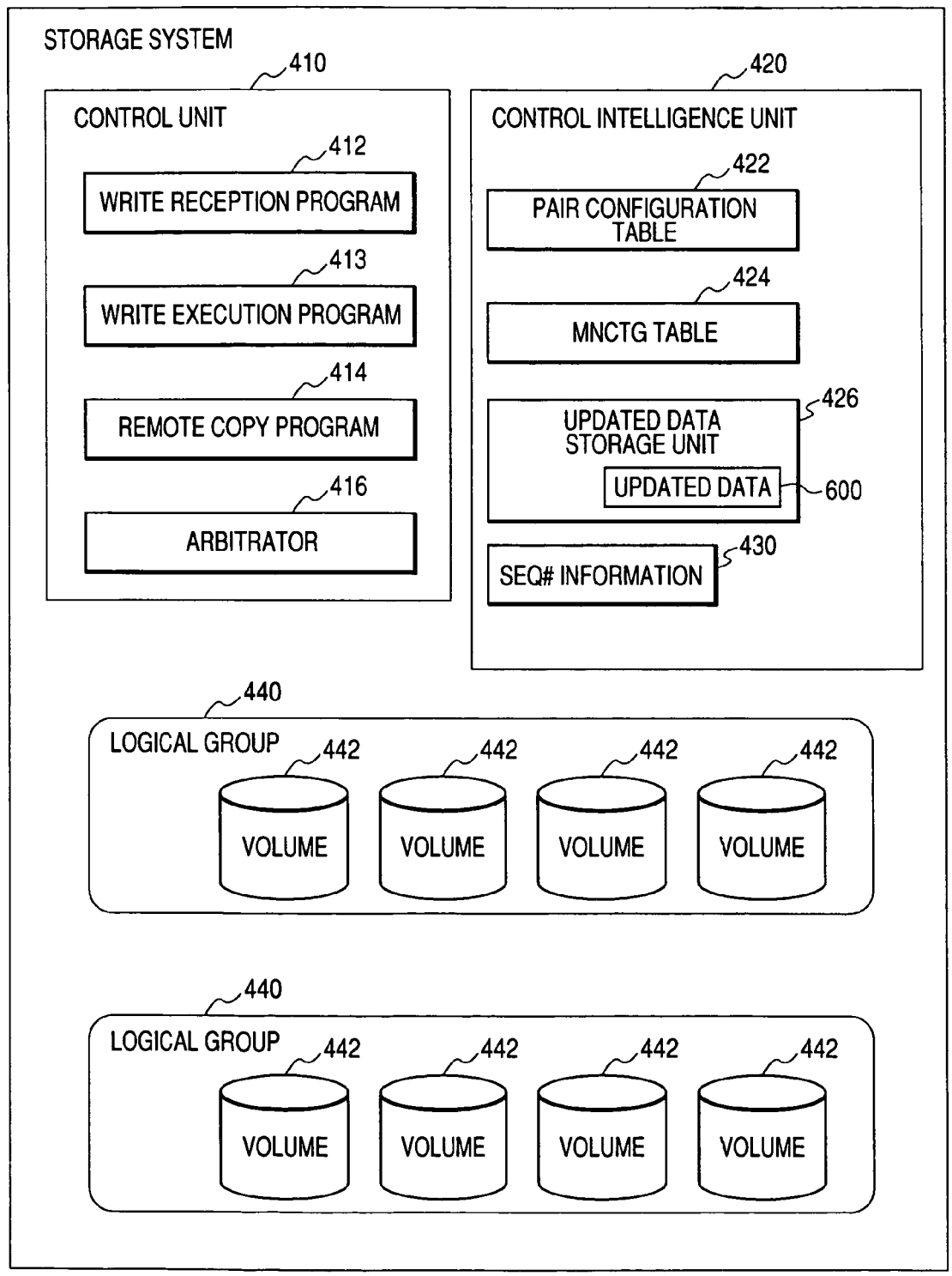
FIG. 4 is a diagram showing an exemplary structure of a storage system.

FIG. 4 is a diagram showing an exemplary structure of the storage system. Components of FIG. 4 are to be activated on their unit basis depending on which of the similarly-structured primary and secondary storage systems 120 and 130 serves as a source or a destination for processing a synchronous remote copy pair that will be described later, and which serves as a source or a destination for processing an asynchronous remote copy pair. In consideration thereof, by referring to FIG. 4, the storage system is described for its structure with no specific distinction between the primary and secondary storage systems 120 and 130. When the components are described for their processing details, a description will be made which component is activated when.

The storage system is mainly configured by a control unit 410, a control intelligence unit 420, and the volumes 442.

The control unit 410 is provided with: a write reception program 412; a write execution program 413; a remote copy program 414 for executing remote copy; and an arbitrator 416 that will be described later. The write reception program 412 receives the write request 300 from the host or other storage systems for processing, and the write execution program 413 executes a write process with respect to the volumes 442. The control unit 410 is configured by the CPU 121 in the storage system executing the programs stored in the memory 122.

The control intelligence unit 420 is provided with: a PAIR configuration table 422; an MNCTG table 424; an updated data storage unit 426; and SEQ# information 430. The updated data storage unit 426 stores updated data 600 that will be described later. Various types of information in the control intelligence unit 420 is actually stored in the memory 122 or the storage device 125 in the storage system.

The volume 442 is a logical device configured by the storage device 125. The volume 442 in the primary storage system 120 stores data for access mainly by the primary host 110. On the other hand, the volume 442 in the secondary storage system 130 stores a copy of the data stored in the volume 442 in the primary storage system 120. When the secondary host 140 becomes in charge of operation using the secondary storage system 130 due to a failure or others occurred to the primary site, used is the data stored in the volume 442 in the secondary storage system 130.

The storage system includes one or more logical groups 440, each of which is configured by the volumes 442. The details of the logical group are left for later description. Note here that the storage system may have any volume 442 that is not belonging to the volume 440.

Figure 9:
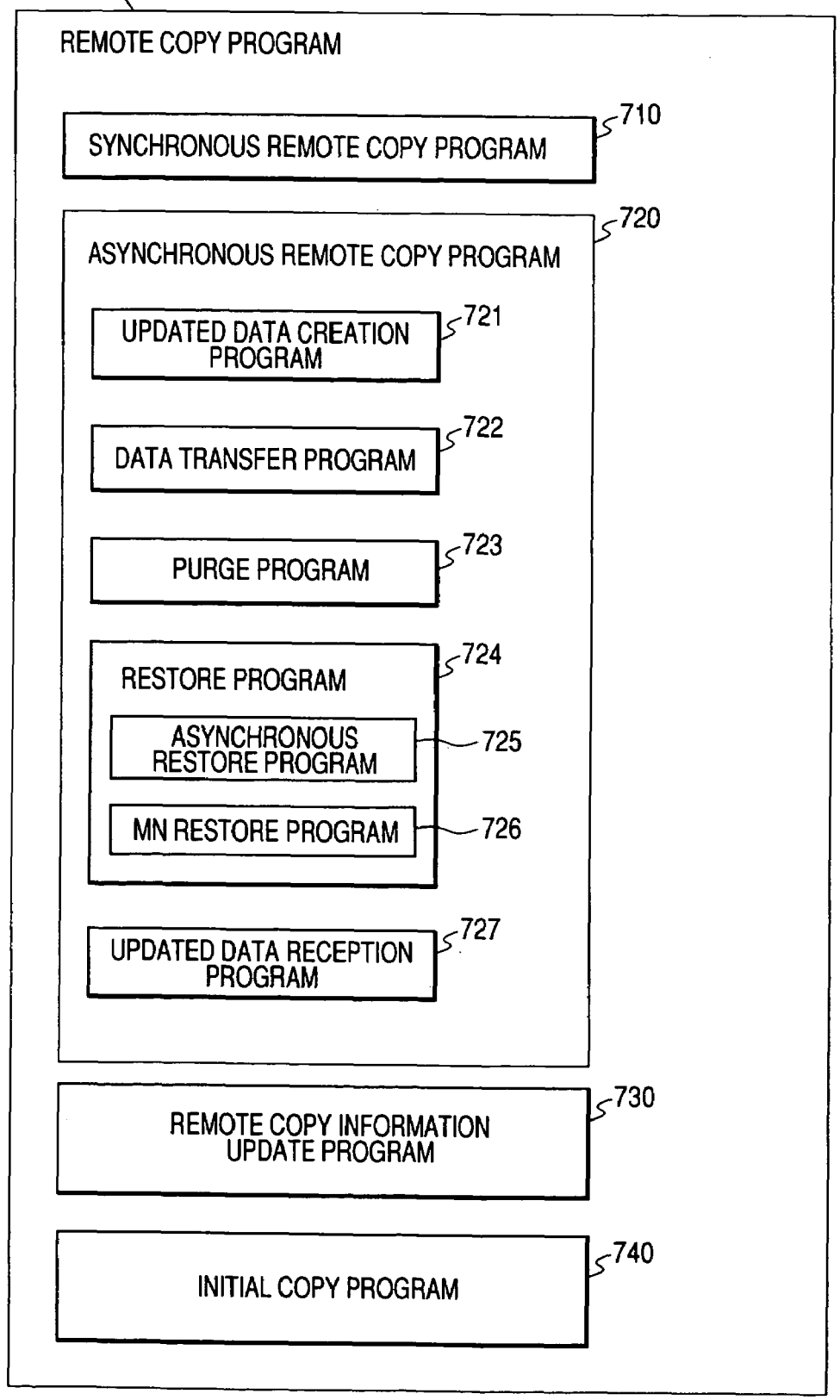
FIG. 9 is a diagram showing an exemplary structure of a remote copy program.

By referring to FIG. 9, described next is an exemplary structure of the remote copy program 414 in the storage system. The remote copy program 414 is provided with: a synchronous remote copy program 710; an asynchronous remote copy program 720; a remote copy information change program 730; and a initial copy program 740. The remote copy information change program 730 updates the PAIR configuration table 422, the MNCTG table 424, or others. The asynchronous remote copy program 720 is provided with: an updated data creation program 721; a purge program 723; and a restore program 724. The restore program 724 includes an Asynchronous restore program 725, and an MN restore program 726. Although the components in the remote copy program 414 will be described later, described here is the outline of synchronous and asynchronous remote copy processes to be executed by the remote copy program 414.

In the below, a volume serving as a copy source is referred to as source volume, and a volume serving as a copy destination is referred to as destination volume. The storage system including a source volume is referred to as source storage system, and the storage system including a destination volume is referred to as destination storage system. The pair of source and destination volumes is referred to as remote copy pair.

Described first is the outline of the synchronous remote copy process.

The synchronous remote copy program 710 executes a process for mirroring between a source volume in a source storage system and a destination volume in a destination storage system. When the source storage system receives the write request 300 directed to the source volume for synchronous remote copy, the synchronous remote copy program 710 execute a process in accordance with a pair state. The pair state indicates a state between the source and destination volumes, including 5 states of Simplex, Initial-Copying, Duplex, Suspend, and Duplex-Pending. The pair state is recorded for management in the PAIR configuration table 422 in the control intelligence unit 420, which will be described later.

In the Simplex state, no remote copy is yet started between the source and destination volumes. In the present embodiment, with the pair state of Simplex, presumably, no remote copy is defined. Therefore, In the Simplex state, the remote copy program 414 is not activated.

In the Duplex state, a remote copy pair is established between the source and destination volumes. The remote copy pair is through with initial copy that will be described later, and the source and destination volumes having the identical data. With the synchronous remote copy, the write data 320 of the write request 300 directed to the source volume is restored also to the destination volume, and then an acknowledgment of write request is forwarded to the program from which the write request 300 is issued, e.g., the application 212 in the host. Accordingly, the data in the destination volume becomes identical to the data in the source volume except for a storage area in progress of data writing. In the below, the expression of "restoring data to a volume" denotes making the data accessible also in the volume, e.g., data writing to the volume, or when the storage system includes cache memory, data writing on the cache memory as data of the volume.

In an exemplary exceptional case that volumes are each storing their unique identifier, for a specific storage area in the volumes each storing such an identifier, the data in the destination volume may not be identical to the data in the source volume. Such identicalness of data is expressed as "macroscopically identical" in the below.

In the Duplex state, the process for execution by the synchronous remote copy program 710 when the source storage system receives the write request 300 directed to the source volume will be described later by referring to a flowchart. When a remote copy pair is in the Duplex state, the write request 300 directed to the destination volume may be rejected to accept or process the write request 300, or may be done processing that can obtain the result equal with it for the purpose of keeping the data identical between the source and destination volumes, for example.

The Initial-Copying state is a transition state from Simplex to Duplex, and if required, initial copy is performed in this state from the source volume to the destination volume. The initial copy is performed by the initial copy program 740, and data copying is continuously performed from the source volume to the destination volume until the data becomes macroscopically identical between the source and destination volumes. After such initial copy, when any process needed for state transition to Duplex is through, the pair state is changed to Duplex. The process for execution by the synchronous remote copy program 710 when the source storage system receives the write request 300 directed to the source volume during the Initial-Copying state will be described later.

In the Suspend state, the write data 320 in the write request 300 directed to the source volume is not restored to the destination volume. In this state, macroscopically identical between the source and destination volumes is not assured. The state transition to Suspend is performed when storage system accept the suspend command from an operator or the management software 214.

The state transition may be also performed when storage system can not transfer the data from the source volume to the destination volume. In the below, the latter case is specifically referred to as Failure-Suspend state. The Failure-Suspend state is mainly caused by any failure occurring to the source or destination volume, any failure occurring to the source or destination storage system, any failure occurring to the communications link between the source and destination storage systems, or the like.

Note that, in the Duplex state, when the destination storage system is rejecting to accept or process the write request 300 issued to the destination volume not by the source storage system but by any other apparatuses, e.g., the secondary host 140, or when any related process is being in progress, the destination storage system may be allowed for a write process to the destination volume in response to the state transition into Suspend (Failure-Suspend state included).

After the state transition into Suspend, if receiving the write request 300 directed to the source or destination volume, the storage system may record the write address 330 in the write request 300 as a differential archive while processing the write request 300. With this being the case, the synchronous remote copy program 710 is in charge of the process of recording the differential archive. Although not shown, the differential archive may be information included in the control intelligence unit 420. Exemplarily, differential archive is managed by the bitmap format.

In the Failure-Suspend state, the source storage system may be functionally allowed to reject to accept or process the write request 300 issued to the source volume. If this is the case, macroscopically identical between the source and destination volumes is assured even after the communication link between the source and destination storage systems is downed. Accordingly, the consequential data loss is prevented even if any failure occurs to the source storage system after the communications link is downed. Such a function is referred to as Failure-Suspend write prohibition function.

The Duplex-Pending state is a transition state from Suspend to Duplex, and a data copy process is executed in this state from the source volume to the destination volume. After macroscopic identicalness is established between the source and destination volumes as described for the Duplex state, the pair state will transit the Duplex state. In this Duplex-Pending state, using the differential archive recorded by the storage system in the Suspend state, the data copy process is executed only to the storage area(s) showing no data identicalness between the source and destination volumes. Such a data copy process is referred to as differential copy process. The time taken for copying can be reduced by using the differential copy process. This differential copy process is executed by the initial copy program 740. In the Duplex-Pending state, the process for execution by the synchronous remote copy program 710 when the source storage system receives the write request 300 issued to the source volume will be described later.

Note that, in the above description, the Initial-Copying state and the Duplex-Pending state are described as each being different. Alternatively, these states may be displayed as a single state for state transition.

Described next is the outline of the asynchronous remote copy process.

In the asynchronous remote copy process, similarly to the synchronous remote copy process, mirroring is performed between the source volume in the source storage system and the destination volume in the destination storage system. Unlike the synchronous remote copy, when the pair state is Duplex state in the asynchronous remote copy, restoring of the write data 320 in the write request 300 directed to the destination volume is performed independent with (asynchronous to) forwarding of an acknowledgment of write request toward the program being a source of the write request 300, e.g., the application 212 in the host.

For data copy from the source volume to the destination volume, the asynchronous remote copy program 720 of the source storage system creates the updated data 600, whenever the source storage system accepts the write request 300. Then, the source storage system transmits the updated data 600 to the destination storage system. In the destination storage system, based on the write address 330 included in the updated data 600, the asynchronous remote copy program 720 writes the write data 320 to the destination volume, wherein, the updated data 600 includes the write data 320 written into the source storage system, and the write address 330 in the source volume for the write data 320.

As this advanced version in the present embodiment, the updated data 600 may include sequence information indicating issuance order of the write requests 300. The asynchronous remote copy program 720 of the source storage system creates updated data 600 including the sequence information, and transmits it to the destination storage system. In the destination storage system, the asynchronous remote copy program 720 writes write data 320 to the destination volume in the issuance order of the write requests 300 based on the sequence information.

For more efficient asynchronous remote copy process, considered here is an exemplary case where a plurality of write requests 300 are issued to any one specific storage area in the source volume in a certain period of time. In such a case, instead of forwarding the updated data 600 created for every write request 300 to the destination storage system, only the updated data 600 created for the write request 300 lastly issued in the period of time to the destination storage system.

Alternatively, if the storage system includes cache memory, the write data 320 may be stored on the cache memory in the source storage system, and immediately before the write data 320 is updated on the cache memory in the source storage system, data copying for creating the updated data 600 may be waited. In more detail, responsively when the write data 320 on the cache memory is updated by another write request 300, the write data 320 may be copied from the cache memory to the updated data storage unit 426 so that the write data 320 is included in the updated data 600. In this case, until the write data 320 is copied from the cache memory to the updated data storage unit 426, the updated data 600 is provided with a pointer that indicates the storage area on the cache memory in the source storage system, in which the write data 320 is stored.

The asynchronous remote copy program 720 also executes a process in accordance with the pair state, including 6 states of Simplex, Initial-Copying, Duplex, Suspend, Duplex-Pending, and Suspending.

The states of Simplex, Initial-Copying, Suspend, and Duplex-Pending are similar to the case of synchronous remote copy.

That is, in the Simplex state, no remote copy pair is defined between the source and destination volumes, and thus the remote copy program 414 is not activated. In the Initial-Copying state or the Duplex-Pending state, the copy process is executed by the initial copy program 740. In this state, when the source storage system receives the write request 300 directed to the source volume, the updated data creation program 721 executes the process that will be described later. In the Suspend state, instead of restoring the write request 300 directed to the source volume not being executed, the updated data creation program 721 records the above-described differential archive.

The Duplex state is basically similar to the case of the synchronous remote copy, and the write data 320 included in the write request 300 accepted by the source storage system is restored asynchronously to the destination volume. This is why the data identicalness between the source and destination volumes is not the same as in the synchronous remote copy. Here, the process to be executed by the updated data creation program 721 when the source storage system accepts the write request 300 directed to the source volume in the Duplex state will be described later. Moreover, in the asynchronous remote copy, the data copy process to be executed by the data transfer program 722 from the source storage system to the destination storage system will be also described later.

The Suspending state is a transition state from Duplex to Suspend. With the asynchronous remote copy program 720, the Suspend state will be reached via the Suspending state. In this state, the source and destination storage systems may execute a process of restoring the updated data 600 to the destination storage system. Note here that when there is any updated data 600 could not be restored to the destination storage system in the Suspending state, the updated data creation program 721 may record the write address 330 in the not-restored updated data 600 to the above-described differential archive.

As described above, both in the synchronous and asynchronous remote copy processes, the source storage system is allowed to accept the write request 300 directed from the host to the source volume both in the Initial-Copying state and the Duplex-Pending state. Described now are the process to be executed in such a case. This process described below is executed by the synchronous remote copy program 710 for the synchronous remote copy process, and by the updated data creation program 721 for the asynchronous remote copy.

In the Initial-Copying state and the Duplex-Pending state, the initial copy program 740 is executing the initial copy or differential copy. At such copy execution, when the source storage system accepts the write request 300 issued to the source volume, the synchronous remote copy program 710 or the updated data creation program 721 execute the process similar to that for the Duplex state with respect to the write request 300 for a completion part of the initial copy or the differential copy.

That is, the synchronous remote copy program 710 forwards the write request including the write data 320 to the destination volume, and after checking that the write request is restored to the destination storage system, the synchronous remote copy program 710 returns an acknowledgment of write request to the host. The updated data creation program 721 creates the updated data 600 and stores in the updated data storage unit 426 by using accepts write request 300.

On the other hand, if the write request 300 received by the source storage system during initial copy or differential copy is the one directed to the part in the source volume not yet completed with initial copy nor differential copy, the synchronous remote copy program 710 or the updated data creation program 721 execute the same process that for the Suspend state. That is, the synchronous remote copy program 710 or the updated data creation program 721 records the write address 330 in the write request 300 to a differential archive, and forwards an acknowledgment of write request to the write execution program 413.

FIG. 5 is a diagram showing an exemplary PAIR configuration table 422 provided in the storage system of FIG. 4. The PAIR configuration table 422 stores information about source volume IDs, destination volume IDs, the pair states, the other-end storage system IDs, logical group IDs, and types.

The source volume ID is information assigned to the source volume for remote copy to uniquely identify the source volume. The destination volume ID is information assigned to the destination volume for remote copy to uniquely identify the destination volume.

The pair state indicates the pair state of a source or destination volume recorded in the PAIR configuration table and provided by the storage system having the PAIR configuration table 422.

For the storage system having a source volume, the other-end storage system ID is information for identifying the destination storage system having a destination volume. For the storage system having a destination volume, the other-end storage system ID is information for identifying the source storage system having a source volume.

The logical group ID is information for identifying a logical group including a source or destination volume recorded in the PAIR configuration table 422 and provided by the storage system having the PAIR configuration table 422. Here, the logical group is a group including one or more volumes 442 provided by any one specific storage system. For restoring the write data 320 directed to the volume(s) 442, the logical group is defined as a unit to assure the data-write-sequence consistency based on the issuance sequence of the write requests 300.

In the present embodiment, as a precondition, the logical group ID is so assigned that logical groups for a remote copy pair, i.e., a logical group for a source volume and that for a destination volume, are assigned with a same-value logical group ID for identification in the source and destination storage systems. Such ID assignment is not necessary if the source and destination storage systems both know the logical group IDs of the remote copy pair, i.e., a logical group ID for the source volume and that for the destination volume.

The type denotes a type of the remote copy process to be executed between any two volumes indicated by a source volume ID and a destination volume ID, and can take either "synchronous" or "asynchronous" as a value.

Figure 10:
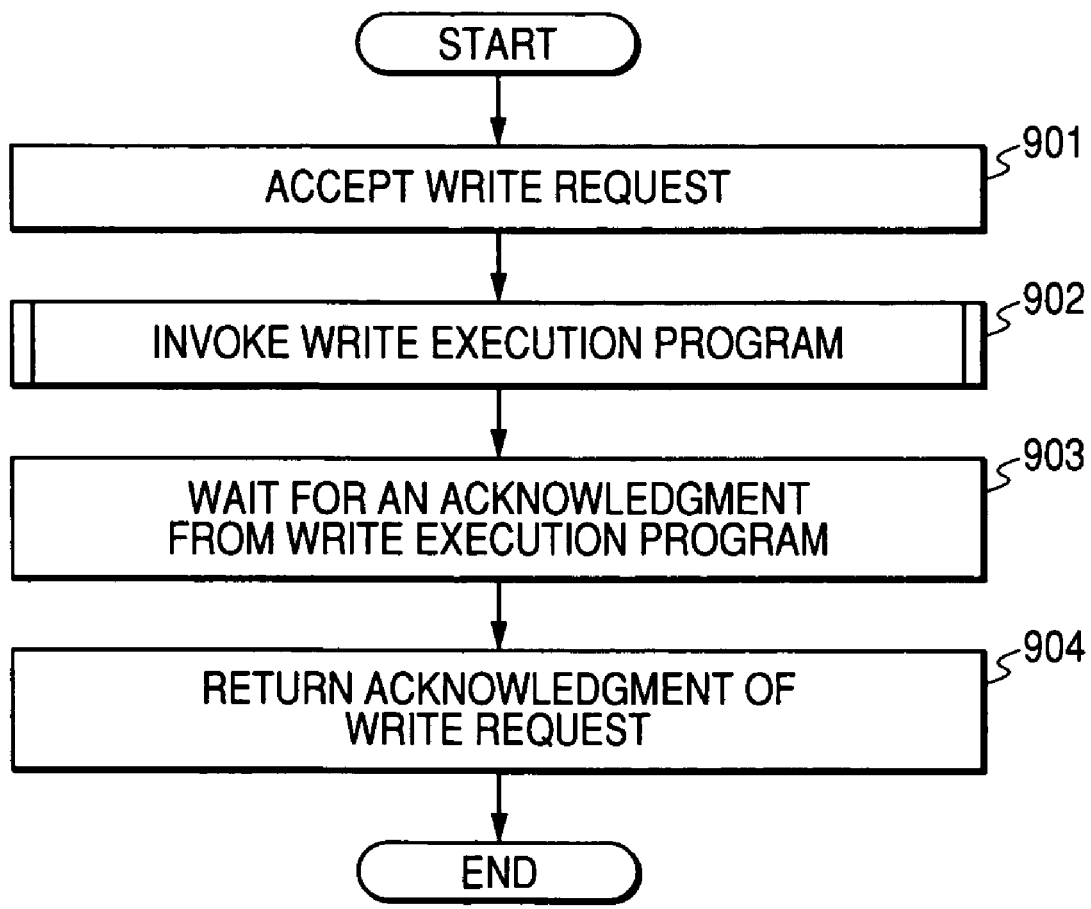
FIG. 10 is a diagram showing an exemplary process to be executed by a write reception program.

FIG. 10 is a diagram showing an exemplary process for execution by the write reception program 412 as a part of the control unit 410 in the respective storage systems. The process for the write reception program 412 of FIG. 10 is executed when the respective storage systems serves as the source storage system for synchronous remote copy, the destination storage system for synchronous remote copy, or the source storage system for asynchronous remote copy.

In step 901, the write reception program 412 receives the write request 300 from the host or any other the storage systems. At this time, as shown in FIG. 3, the write reception program 412 receives, as the write request 300, the write time 310, the write data 320, the write target volume ID 340, the write address 330, and the data length 350.

The write reception program 412 then invokes the write execution program 413 in step 902, and waits for an acknowledgment from the write execution program 413 in step 903. Lastly, in step 904, the write reception program 412 returns an acknowledgment of write request back to the host or the storage system being the source of the write request.

Figure 11:
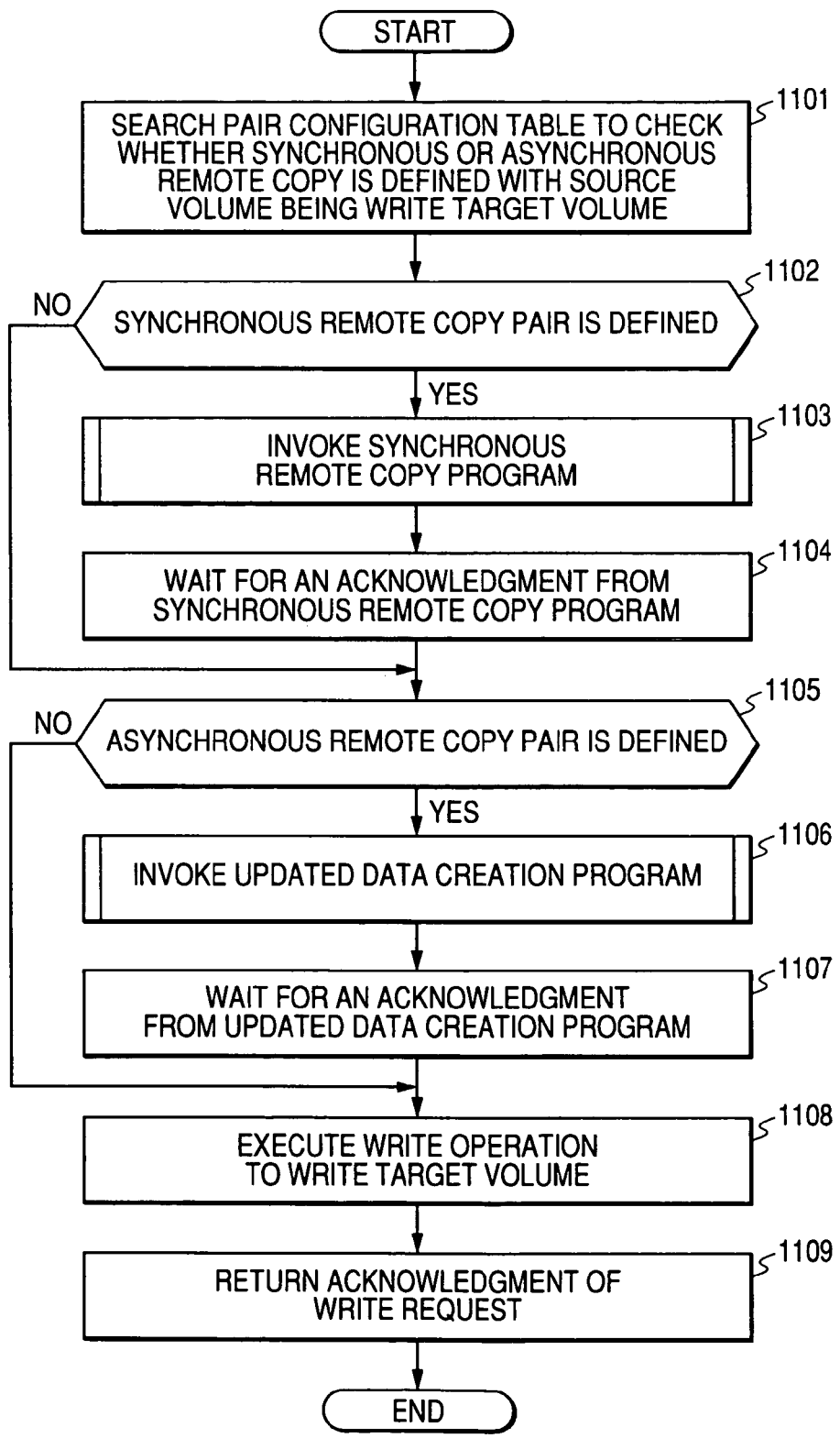
FIG. 11 is a diagram showing an exemplary process to be executed by a write execution program.

FIG. 11 is a diagram showing an exemplary process for the write execution program 413 to be invoked by the write reception program 412. Note that the write execution program 413 is invoked also by the Asynchronous restore program 725 or the MN restore program 726, both of which will be described later. Therefore, the process for the write execution program 413 is executed when the respective storage systems serves as the source storage system for synchronous remote copy, the destination storage system for synchronous remote copy, the source storage system for asynchronous remote copy, or the destination storage system for asynchronous remote copy.

In step 1101, the write execution program 413 specifies the volume 442, and checks the volume 442 whether a remote copy pair is defined therein with a source volume being the volume 442. Such volume specification is made by referring to the write target volume ID included in the write request 300 received by the write reception program 412 in step 901 of FIG. 10, or a write command provided by the Asynchronous restore program 725 or the MN restore program 726, which will be described later. To be more specific, the write execution program 413 uses the write target volume ID 340 as a key to search the PAIR configuration table 422 to check whether information that the source volume ID is the same as write target volume ID is recorded in the PAIR configuration table 422.

In step 1102, the write execution program 413 also checks whether a synchronous remote copy pair is defined with a source volume being the volume 442 indicated by the write target volume ID. Here, if no such remote copy pair whose source volume is the volume 442 indicated by the write target volume ID in step 1101 is found, the answer for step 1102 is "no". On the other hand, when such a remote copy pair is found in step 1101, the write execution program 413 refers to the PAIR configuration table 422 to check whether the type of the remote copy pair is "synchronous". If the type shows "synchronous", the pair is determined as a synchronous remote copy pair.

When the answer for step 1102 is "no", the procedure skips steps 1103 and 1104, and goes to step 1105.

When the answer for step 1102 is "yes", in step 1103, the write execution program 413 invokes the synchronous remote copy program 710 using, as parameters, the source volume ID and the other-end storage system ID acquired the PAIR configuration table 422. In step 1104, the write execution program 413 waits for a response from the synchronous remote copy program 710.

In step 1105, the write execution program 413 checks if any asynchronous remote copy pair is defined with a source volume as being the volume 442 indicated by the write target volume ID. The process in this step 1105 is executed in a similarly method to step 1102 except that the write execution program 413 refers to the PAIR configuration table 422 to check whether the type of the remote copy pair is "asynchronous".

When the answer for step 1105 is "no", the procedure skips steps 1106 and 1107, and goes to step 1108.

When the answer for step 1105 is "yes", in step 1106, the write execution program 413 invokes the updated data creation program 721 using, as parameters, the source volume ID, the logical group ID, and the other-end storage system ID, all of which are acquired the PAIR configuration table 422. In step 1107, the write execution program 413 then waits for an acknowledgment from the updated data creation program 721.

In step 1108, the write execution program 413 executes a write operation with the volume 442, which is a write request target.

Lastly, in step 1109, the write execution program 413 forwards an acknowledgment of write request to the write reception program 412, the Asynchronous restore program 725, or the MN restore program 726, whichever being the source of the write operation.

Figure 12:
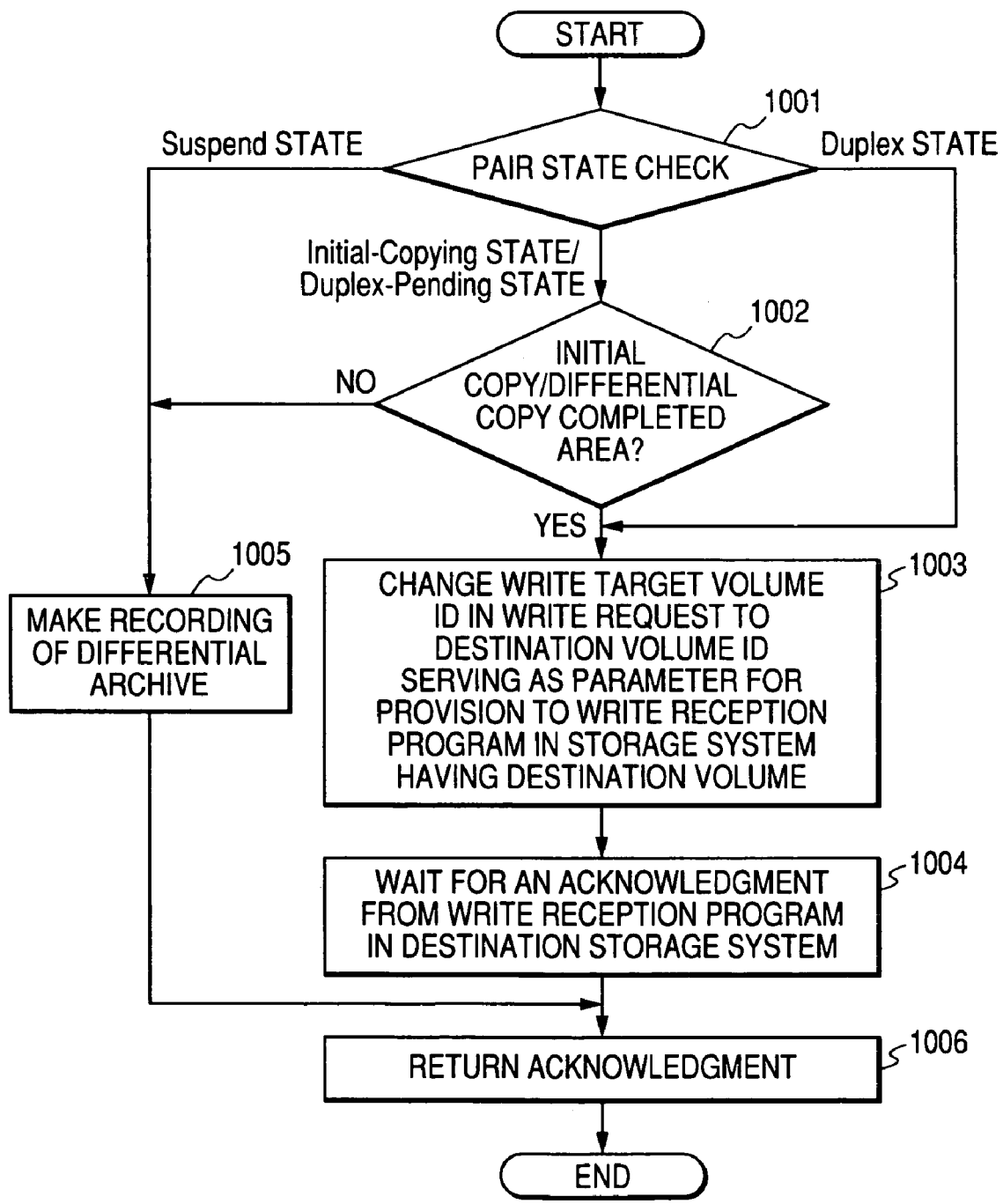
FIG. 12 is a diagram showing an exemplary process to be executed by a synchronous remote copy program.

FIG. 12 is a diagram showing an exemplary process to be executed by the synchronous remote copy program 710 when the write execution program 413 invokes the synchronous remote copy program 710 in step 1103 of FIG. 11. The process for the synchronous remote program 710 is executed when the respective storage systems serves as the source storage system for synchronous remote copy.

After restoring the write data 320 to the destination storage system, the synchronous remote copy program 710 returns an acknowledgment to the write execution program 413 so that the synchronous remote copy is achieved.

In step 1001, the synchronous remote copy program 710 refers to the PAIR configuration table 422 to check the pair state of the synchronous remote copy pair whose source volume is the volume 442 indicated by the write target volume ID 340.

When the pair state is Suspend, the procedure goes to step 1005. In step 1005, the synchronous remote copy program 710 records the write address 330 in the write request 300 to a differential archive, and in step 1006, forwards an acknowledgment to the write execution program 413. This is the end of the process.

When the pair state is Duplex, the procedure skips step 1002, and execute the process in step 1003 and onwards.

When the pair state is Initial-Copying or Duplex-Pending, the synchronous remote copy program 710 determines whether or not the storage area targeted for writing by the write request 300 is the storage area already copied by initial copy or differential copy executed by the initial copy program 740 (step 1002). As will be described later, the initial copy program 740 execute an initial copy process or a differential copy process using a copy pointer indicating the address of the storage area in progress of the initial copy process or the differential copy process. Accordingly, to make a determination in step 1002, the synchronous remote copy program 710 compares between the address indicated by the copy pointer and the write address 330 in the write request 300. Herein, although not shown, the copy pointer is information included in the control intelligence unit 420.

When the storage area targeted for writing in the write request 300 is not yet copied by initial copy nor differential copy, i.e., when step 1002 determines "No", the synchronous remote copy program 710 execute the processes in steps 1005 and 1006 that is the same as the case for the Suspend state.

On the other hand, when the storage area targeted for writing in the write request 300 is already copied by initial copy or differential copy, i.e., when step 1002 determines "Yes", the synchronous remote copy program 710 execute the process in step 1003 and onwards.

In step 1003, the synchronous remote copy program 710 changes the write target volume ID 340 found in the write request 300 received by the write reception program 412 to the destination volume ID provided by the write execution program 413 as a parameter. The resulting write request 300 is then directed to the write reception program 412 in the destination storage system including the destination volume 442.

In step 1004, the synchronous remote copy program 710 waits for an acknowledgment of the write request from the write reception program 412 in the destination storage system. After accepting the acknowledgment from the write reception program 412, the synchronous remote copy program 710 forwards an acknowledgment of write to the write execution program 413 in step 1006.

Herein, the write reception program 412 in the destination storage system receiving the write request 300 from the synchronous remote copy program 710 executes the processes described by referring to FIG. 10.

The synchronous remote copy program 710 uses the write time 310 found in the write request 300 received by the write reception program 412 as the write time 310 in the write request 300 directed toward the write reception program 412 in the destination storage system, and then forwards the write request 300 to the destination storage system. In this method, the data-write-sequence consistency is successfully assured among a plurality of storage systems as will be described later.

Described next is the outline of a process for execution by the initial copy program 740. Once the initial copy program 740 is activated, the pair state of a remote copy pair will be in the Initial-Copying or the Duplex-Pending state. The process for the initial copy program 740 is executed when the respective storage systems serves as the source storage system for synchronous remote copy, or the source storage system for asynchronous remote copy.

For initial copy, the initial copy program 740 first refers to the PAIR configuration table 422 to put the state of the remote copy pair being a target for initial copy into the Initial-Copying state. Next, the copy pointer is moved to the starting address of the source volume. The initial copy program 740 then performs data transmission to the destination storage system for data copy to the destination volume. Here, the transmitting data is the one stored in the storage area of a fixed size from the address indicated by the copy pointer. The initial copy program 740 then advances the address position indicated by the copy pointer by the fixed size. Thereafter, the initial copy program 740 repeatedly executes the copy process and update of the copy pointer. When the copy pointer reaches the ending address of the source volume, the initial copy program 740 changes the pair state of the remote copy pair defined between the source and destination volumes into the Duplex state, i.e., updates the pair state in the PAIR configuration table 422. This is the end of the initial copy process.

For a differential copy process, the initial copy program 740 executes the process basically similar to that for initial copy. However, the differential copy process is different from the initial copy process in the following two respects. In the first respect, at the beginning of the differential copy process, the pair state of a remote copy pair being a process target is not put into the Initial-Copying state but into the Duplex-Pending state. In the second respect, for data copy of a fixed size from the address position indicated by the copy pointer, the initial copy program 740 does not transmit the entire data to the destination storage system. Instead, the initial copy program 740 refers to the differential archive to select only data of address recorded as the differential archive for transmission to the destination storage system. Other than these two respects, the differential copy process is similar to the initial copy process.

As described in the foregoing, the synchronous remote copy process is implemented through cooperation among the write reception program 412, the write execution program 413, the synchronous remote copy program 710, and the initial copy program 740.

Described next is the operation of asynchronous remote copy between the source volume 442 in the logical group 440 of the source storage system and the destination volume 442 in the logical group 440 in the destination storage system.

FIG. 6 shows exemplary SEQ# information 430 including sequential numbers used by the updated data creation program 721. Such sequential numbers are hereinafter referred to as SEQ#. The SEQ# information 430 has attributes of the logical group ID and the SEQ#. The logical group ID is assigned to the logical group 440 as a collection of the volumes 442 in any one storage system. The logical group 440 is a unit that assures the data-write-sequence consistency. The logical group ID is a number that uniquely identifies the logical group 440. Here, the logical group 440 including no such volume 442 can also be defined, and such a resulting logical group 440 is also assigned with a logical group ID.

The SEQ# and the logical group 440 have a one-to-one relationship therebetween, and every time the write request 300 directed to the volume 442 in the logical group 440, the updated data creation program 721 increments the SEQ# by 1. By using such SEQ#, the write data can be restored to the destination volume while assuring the data-write-sequence consistency also in the destination storage system.

Herein, the state in which the data-write-sequence consistency is assured in the destination storage system means the state in which the write data 320 based on the write request 300 accepted by the source storage system before a certain time is all restored to the destination volume 442, but the write data 320 based on the write request 300 accepted by the source storage system after the time is not at all restored to the destination volume 442. In the logical group 440, the data-write-sequence consistency is assured between one or more volumes 442 belonging to the same logical group 440.

FIG. 7 shows exemplary updated data 600 to be transmitted from the source storage system to the destination storage system in the asynchronous remote copy.

The updated data 600 includes: the write time 310; an SEQ#, the write data 320; a destination volume ID; the write address 330; the data length 350; a logical group ID; and a destination storage system ID.

The write time 310, the write data 320, the write address 330, and the data length 350 are the same as those in the write request 300 to be received by the write reception program 412. As to the SEQ#, the updated data creation program 721 acquires it from the SEQ# information 430. As to the destination volume ID, the logical group ID, and the source storage system ID, the write execution program 413 acquires those from the PAIR configuration table 422 for transmission to the updated data creation program 721 as parameters. The updated data 600 is created by the updated data creation program 721.

Figure 13:
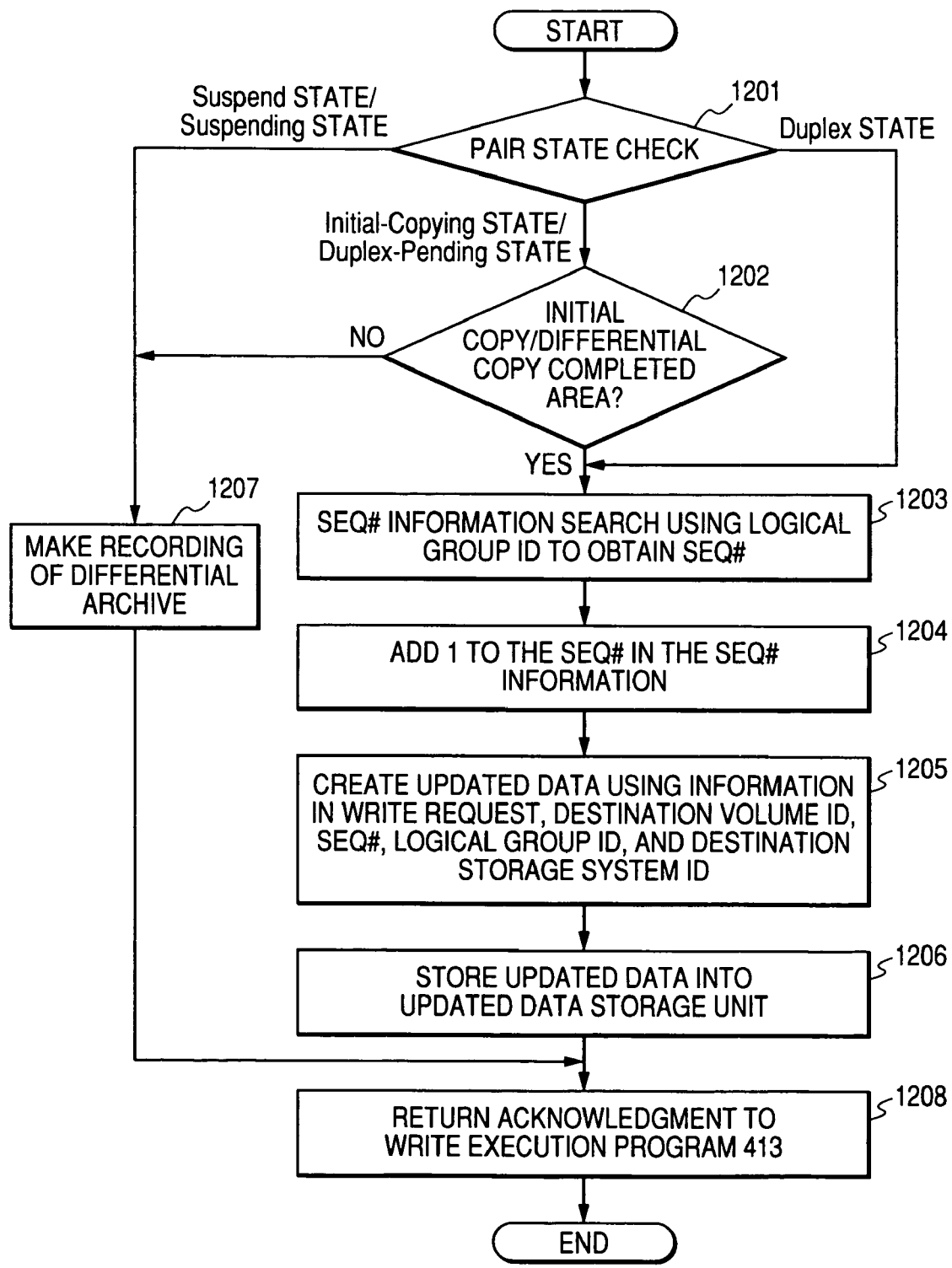
FIG. 13 is a diagram showing an exemplary process to be executed by an updated data creation program.

Described next is the process for execution by the updated data creation program 721. FIG. 13 is a diagram showing an exemplary process to be executed by the updated data creation program 721. The updated data creation program 721 is invoked for activation by the write execution program 413 in step 1106 of FIG. 11. The process for the updated data creation program 721 is executed when the respective storage systems serves as the source storage system for asynchronous remote copy.

The updated data creation program 721 assigns the SEQ# to the write request 300 provided by the host toward the source storage system so that the updated data 600 is created. The SEQ# is used to assure the data-write-sequence consistency on the logical group 440 at the time when the write data 320 in the write request 300 provided by the host toward the source storage system is restored to the destination storage system.

In step 1201, the updated data creation program 721 refers to the PAIR configuration table 422 to check the pair state of an asynchronous remote copy pair with the source volume as being a volume identified by the write target volume ID 340 in the write request 300 provided by the host.

When the pair state is Suspend or Suspending, the updated data creation program 721 records the write address 330 in the write request 300 into the differential archive in step 1207, and forwards an acknowledgment to the write execution program 413 in step 1208. This is the end of the process.

When the pair state is Duplex, the procedure skips step 1202, and execute the process in step 1203 and onwards.

When the pair state is Initial-Copying or Duplex-Pending, the updated data creation program 721 determines whether the storage area targeted for writing in the write request 300 is already copied by initial copy or differential copy executed by the initial copy program 740 (step 1202). To make such a determination in step 1202, the updated data creation program 721 compares the address indicated by the copy pointer used by the initial copy program 740 and the write address 330 in the write request 300.

When the storage area targeted for writing in the write request 300 is not yet copied by with initial copy nor differential copy, i.e., when step 1202 determines "No", the updated data creation program 721 execute the processes in steps 1207 and 1208 that is the same as the case for the Suspend state.

On the other hand, when the storage area targeted for writing in the write request 300 is already copied by with initial copy or differential copy, i.e., when step 1202 determines "Yes", the updated data creation program 721 execute the process in step 1203 and onwards.

In step 1203, the updated data creation program 721 uses as a key the logical group ID 340 provided by the write execution program 413 as a parameter to search the SEQ# information 430 to acquire the current SEQ# of the logical group 440 including the source volume 442.

In step 1204, the updated data creation program 721 then increments by 1 the SEQ# in the SEQ# information 430 to be ready to provide thus incremented SEQ# to the next updated data.

In step 1205, the updated data creation program 721 creates the updated data 600 using the SEQ# acquired in step 1203, the destination volume ID, the logical group ID, and the destination storage system ID in the write request 300 provided by the host. Herein, the IDs are all parameters provided by the write execution program 413.

In step 1206, the updated data creation program 721 stores the resulting updated data 600 to the updated data storage unit 426, and in step 1208, forwards acknowledgment to the write execution program 413.

Figure 14:
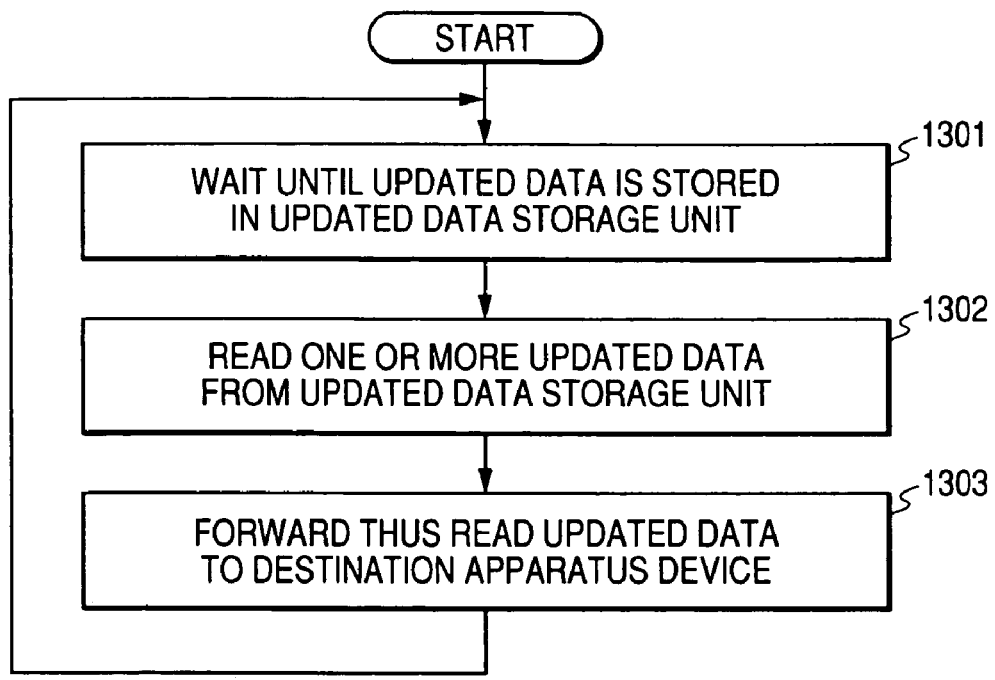
FIG. 14 is a diagram showing an exemplary process to be executed by a data transfer program.

FIG. 14 shows an exemplary process for the data transfer program 722, transmitting the updated data 600 stored in the updated data storage unit 426 by the updated data creation program 721 to the destination storage system. Herein, the process for the data transfer program 722 is executed when the respective storage systems serves as the source storage system for asynchronous remote copy.

In step 1301, the data transfer program 722 waits until the updated data creation program 721 stores the updated data 600 in the updated data storage unit 426. Herein, the data transfer program 722 may execute the following process not when the updated data 600 is stored in the updated data storage unit 426. Specifically, the data transfer program 722 may not execute the following process every time the updated data 600 is stored in the updated data storage unit 426, but only when the updated data 600 of a specific size or more is stored in the updated data storage unit 426, for example.

In step 1302, the data transfer program 722 reads one or more updated data 600 from the updated data storage unit 426, and in step 1303, forwards thus read updated data 600 to the destination storage system. The procedure then returns to step 1301 to repeat the above-described processes.

Figure 15:
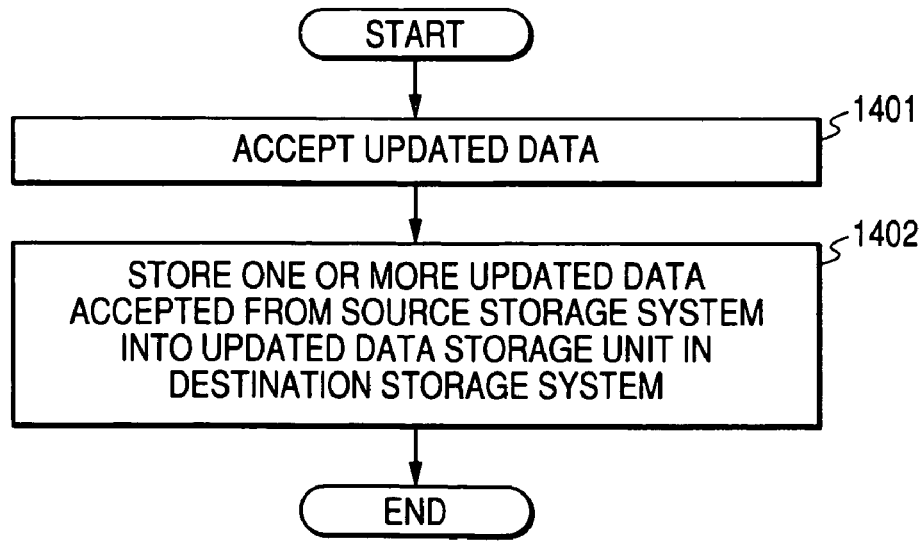
FIG. 15 is a diagram showing an exemplary process to be executed by an updated data reception program 727.

FIG. 15 shows an exemplary process for an updated data reception program 727 in the destination storage system that accepts the updated data 600 from the source storage system. The process for the updated data reception program 727 is executed when the respective storage systems serves as the destination storage system for asynchronous remote copy.

In step 1401, the updated data reception program 727 accepts the updated data 600 from the data transfer program 722 in the source storage system. In step 1402, the updated data reception program 727 stores thus accepted updated data 600 to the updated data storage unit 426 in the destination storage system. This is the end of the process.

Figure 16:
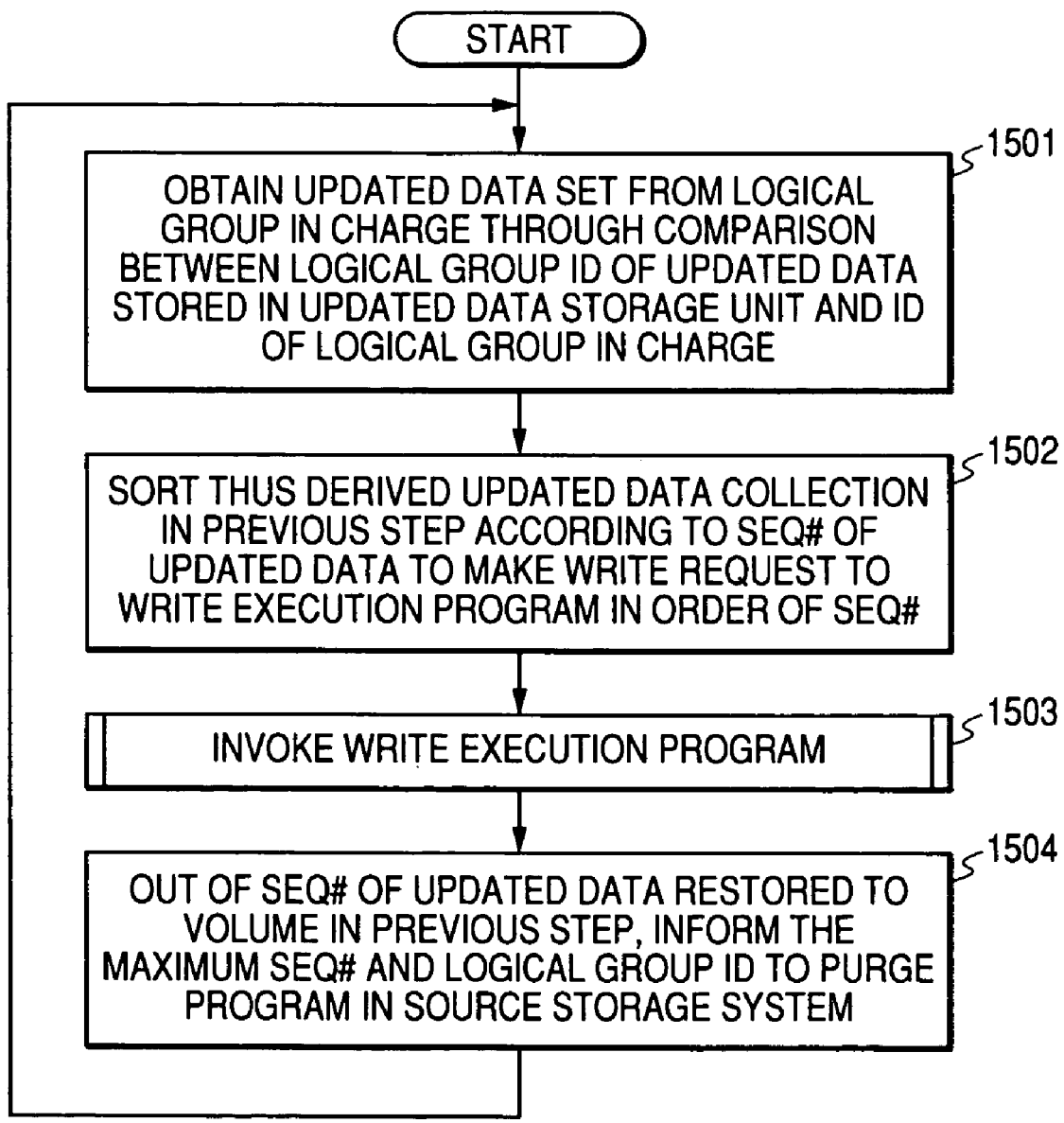
FIG. 16 is a diagram showing an exemplary process to be executed by an Asynchronous restore program.

FIG. 16 is a diagram showing an exemplary process for the Asynchronous restore program 725, restoring the write data 320 to the destination volume based on the contents of the updated data 600 stored in the updated data storage unit 426 in the destination storage system. The Asynchronous restore program 725 and the logical group 440 have a one-to-one relationship therebetween. The process for the Asynchronous restore program 725 is executed when the respective apparatuses serves as the destination storage system for asynchronous remote copy.

In step 1501, the Asynchronous restore program 725 in charge of a specific logical group 440 searches the updated data 600 stored in the updated data storage unit 426 to find the updated data 600 showing a match of the logical group ID with the specific logical group 440. Thus found updated data is regarded as an updated data set.

In step 1502, the Asynchronous restore program 725 uses the SEQ# found in the updated data 600 to sort the updated data set as a result of step 1501. Then, the Asynchronous restore program 725 invokes the write execution program 413 to command it to write the updated data 600 in order of SEQ#. Here, the updated data 600 is the one found in a part showing the consecutive SEQ#, i.e., the part showing perfectly consecutive SEQ# when the updated data 600 in the updated data set is sorted by SEQ#. This command at least includes the write data, the destination volume ID that is the ID of the volume targeted for writing, and the write address.

When invoked by the Asynchronous restore program 725, the write execution program 413 executes the process of FIG. 11, and as a result, the write data is written to the destination volume (step 1503).

When the write data 320 in the updated data 600 found in the part showing the consecutive SEQ# is completely through with restoring, the Asynchronous restore program 725 makes a notification to the purge program 723 in the source storage system in step 1504. Here, The notification includes the maximum SEQ# and the logical group ID. The maximum SEQ# is found in the updated data 600 including the write data 320 that has been written to the destination volume, i.e., SEQ# found in the updated data 600 lastly subjected to writing, and the logical group ID.

The procedure returns to step 1501 again to repeat the process.

Figure 17:
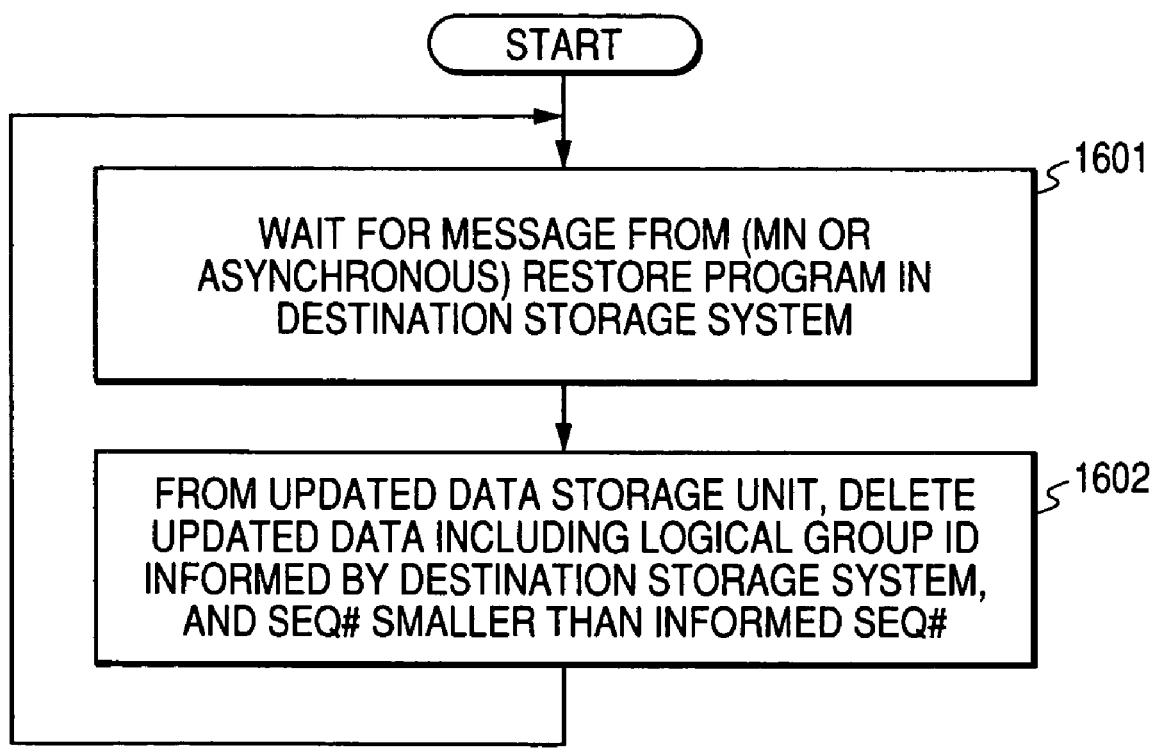
FIG. 17 is a diagram showing an exemplary process to be executed by a purge program.

FIG. 17 is a diagram showing an exemplary process for the purge program 723 in the source storage system receiving the SEQ# and the logical group ID provided by the Asynchronous restore program 725. The process for the purge program 723 is executed when the respective storage systems serves as the source storage system for asynchronous remote copy.

In step 1601, the purge program 723 waits for a message from the Asynchronous restore program 725 or the MN restore program 726 in the destination storage system, the details of which will be described later. In step 1602, from the updated data storage unit 426 in the source storage system, the purge program 723 deletes the updated data 600 having the logical group ID found in the message, and also having the SEQ# smaller than the SEQ# found in the message notified by the Asynchronous restore program 725 or the MN restore program 726 in the destination storage system.

As described in the foregoing, the write data 320 for the source volume in the source storage system is transmitted to the destination volume in the destination storage system asynchronous to the write request 300. Such transmission is performed by the components of: the write reception program 412, the updated data creation program 721, the data transfer program 722, the updated data reception program 727, the Asynchronous restore program 725, the purge program 723, the write execution program 413, and the initial copy program 740. Thus transmitted write data 320 is restored in order of SEQ# on the basis of the logical group 400. In such a method, the asynchronous remote copy process can be implemented with the data-write-sequence consistency assured between the source and destination volumes.

Described above is the method of executing the asynchronous remote copy process while assuring the data-write-sequence consistency in the logical group 440. Described next is the method of executing the asynchronous remote copy process while assuring the data-write-sequence consistency among a plurality of volumes in a plurality of storage systems. That is, in the asynchronous remote copy process, even when the source and destination storage systems are each provided plurally, and the host computer issues write requests 300 to logical volumes of plural source storage systems, the procedure described below can reflect write data in the destination storage systems with assuring the data-write-sequence consistency.

The unit requiring the assurance of the data-write-sequence consistency over a plurality of storage systems is hereinafter referred to as MN consistency group. An MN consistency group includes a plurality of logical volumes 442 belonging to each different storage systems. That is, the MN consistency group is configured by a plurality of logical groups, and the respective the logical groups may be located in different storage systems.

For an asynchronous remote copy process in an MN consistency group with data-write-sequence consistency, the process for the source storage system is similar to the asynchronous remote copy process in the above-described logical group with data-write-sequence consistency. Thus, described now are only differences from the asynchronous remote copy process described above.

For an asynchronous remote copy process in an MN consistency group with data-write-sequence consistency, the destination storage system is required to further include the arbitrator 416 and the MN restore program 726. In the present embodiment, as an alternative to the Asynchronous restore program 725, the MN restore program 726 restores the write data in the updated data 600 stored in the updated data storage unit 426 in the destination storage system. The arbitrator 416 and the MN consistency group have a one-to-one relationship therebetween, and by such an arbitrator 416 commanding the MN restore program 726 to restore the updated data 600, the write data 320 can be restored to the destination volume with the data-write-sequence consistency among a plurality of destination storage systems.

FIG. 8 is a diagram showing an exemplary MNCTG table 424 for use by the arbitrator 416. The MNCTG table 424 is provided with MNCTG IDs, logical group IDs, and the group placement storage system IDs.

The MNCTG ID is identification information for uniquely identifying the MN consistency group.

The logical group ID is identification information for uniquely identifying the logical group 440. The MNCTG table 424 shows that the MN consistency group identified by the MNCTG ID includes the logical group identified by the logical group ID.

The group placement storage system ID is identification information of the storage system that includes the logical group identified by the logical group ID.

Such information is registered by using the management software 214 on the host.

Figure 18:
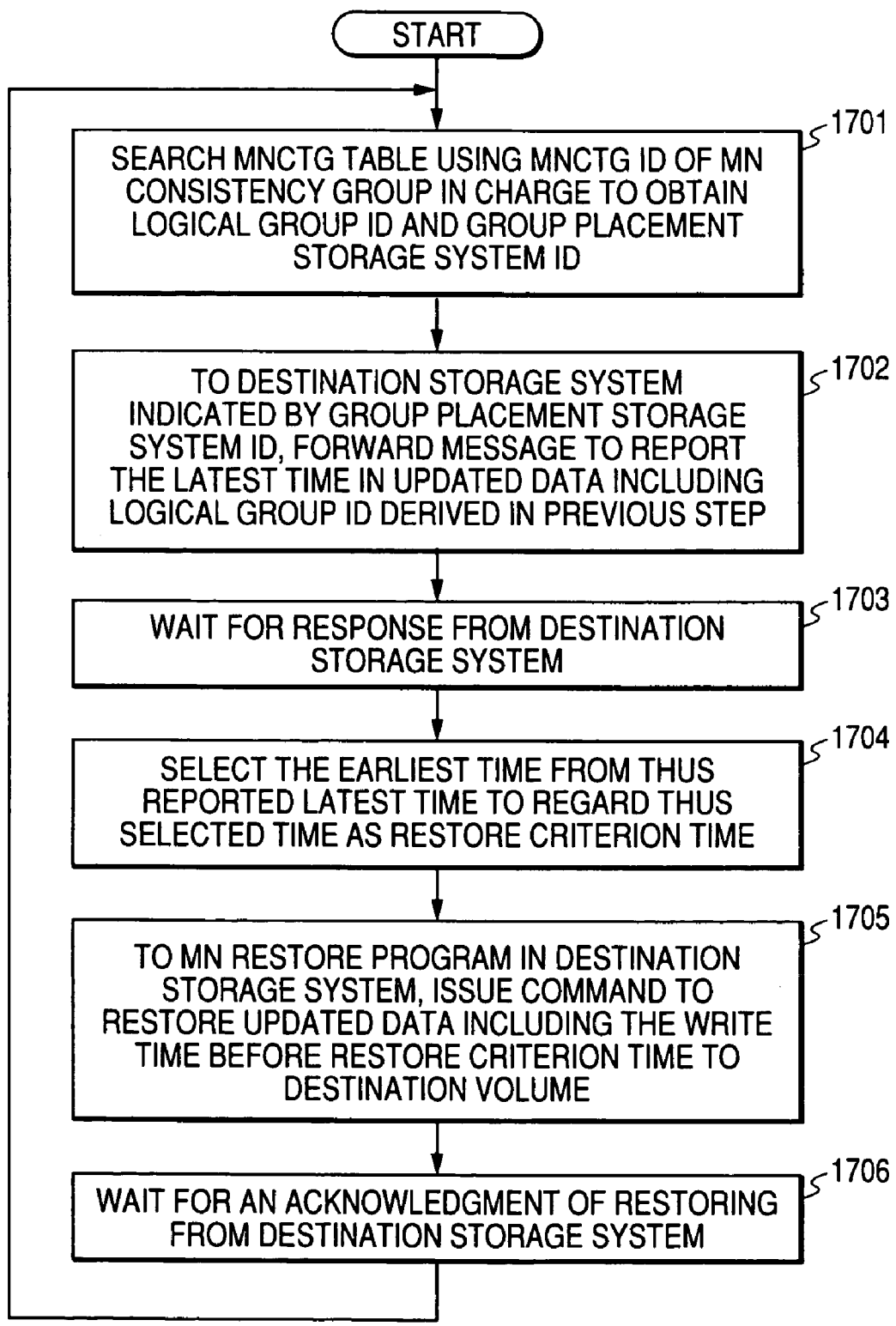
FIG. 18 is a diagram showing an exemplary process to be executed by an arbitrator.

FIG. 18 is a diagram showing an exemplary process for execution by the arbitrator 416.

The arbitrator 416 has a one-to-one relationship with the MN consistency group, and may be activated on any of the destination storage systems. The management software 214 on the host is in charge of specifying on which destination storage system the arbitrator 416 is supposed to activate.

Described now are the details of the process for the arbitrator 416.

In step 1701, the arbitrator 416 searches the MNCTG table 424 using the MNCTG ID of its own MN consistency group to find the logical group IDs of the logical groups belonging to the MN consistency group, and the group placement storage system IDs.

In step 1702, the arbitrator 416 forwards a message to a plurality of destination storage systems indicated by the group placement storage system IDs obtained in step 1701. The message requires to report the latest write time in the updated data 600 having the logical group ID obtained in step 1701.

In step 1703, the arbitrator 416 waits for a response from the destination storage systems to which the message is addressed in step 1702.

In step 1704, the arbitrator 416 selects the earliest time out of the latest times reported by the destination storage systems as the restore criterion time.

In step 1705, the arbitrator 416 issues a command to the MN restore program 726 in the respective destination storage systems each being a destination of the message in step 1702. The command is to restore, to the destination volume, the updated data 600 including the write time 310 before the restore criterion time selected in step 1704.

Lastly, in step 1706, the arbitrator 416 receives an acknowledgment from the destination storage system(s) through with restoring the updated data 600 to the destination volume. The procedure then returns to step 1701.

FIG. 19 is a diagram showing an exemplary process for the MN restore program 726, answering the latest time to the arbitrator 416 in response to the command from the arbitrator 416, and restoring the updated data 600 to the destination volume also in response to the command from the arbitrator 416. Herein, the process for the MN restore program 726 is executed when the respective storage systems serves as the destination storage system for asynchronous remote copy.

In accordance with the command from the arbitrator 416, the MN restore program 726 executes the processes of steps 1801 and 1802 of FIG. 19 A, or processes from steps 1803 to 1808 of FIG. 19 B thereof. Similarly to the Asynchronous restore program 725, the MN restore program 726 is also assigned to every logical group.

The processes of steps 1801 and 1802 are executed when the MN restore program 726 receives a command from the arbitrator 416 to report the latest time.

In step 1801, the MN restore program 726 receives a command from the arbitrator 416 to report the latest time.

In step 1802, the MN restore program 726 checks the updated data 600 including logical group ID is in charge stored in the updated data storage unit 426, i.e., checks the updated data 600 for the latest write time in a range of the consecutive SEQ# (in a range showing perfectly consecutive SEQ#). Thus found latest write time is reported to the arbitrator 416.

The processes in steps 1803 to 1808 are executed when the MN restore program 726 receives a command from the arbitrator 416 to restore the updated data 600.

In step 1803, the MN restore program 726 receives a command from the arbitrator 416 to restore the updated data 600 before the restore criterion time to the destination volume.

In step 1804, the MN restore program 726 then searches the updated data 600 stored in the updated data storage unit 426 for the updated data 600 having the logical group ID is in charge. Thus found updated data 600 is regarded an updated data set.

In step 1805, out of the updated data 600 belonging to the updated data set obtained in step 1804, the MN restore program 726 sorts, using the SEQ#, the updated data 600 having the write time before the restore criterion time notified by the arbitrator 416. Thereafter, a write command is issued to the write execution program 413 to restore the updated data 600 to the destination volume in increasing order of SEQ#. This command at least includes the destination volume ID being the ID of the write target volume, the write address 330, and the write data 320.

After receiving the command, the write execution program 413 writes the write data 320 to the destination volume, the write data received from the MN restore program 726 in the command. With such data writing, the updated data 600 is restored to the destination volume (step 1806).

After data restoring, in step 1807, out of the SEQ# in the updated data 600 restored to the destination volume in step 1806, the maximum SEQ#, i.e., SEQ# found in the updated data 600 lastly restored to the destination volume, is notified to the purge program 723 in the source storage system together with the logical group ID.

Lastly, in step 1808, the MN restore program 726 forwards an acknowledgment of restoring to the arbitrator 416.

The operation of the purge program 723 received the SEQ# from the MN restore program 726 is executed as described in the above.

Here, the arbitrator 416 determines a synchronous time, which indicates synchronous timing between plural destination storage systems, by using write times 310 each included in the updated data 600. Then, the arbitrator 416 instruct the MN restore program 726 of each of the plural destination storage systems to restore the updated data 600, which has a write time 310 before the synchronous time, to a destination. Moreover, by using the SEQ#, each of the plural destination storage systems can assure the write-sequence consistency in the destination storage system.

This thus enables to assure the data-write-sequence consistency even if the source and destination storage systems are configured each plurally.

Described above is the exemplary structure of the information processing system, and the capabilities of the respective storage systems. Described next is the procedure in such an information processing system of migrating an asynchronous remote copy pair among the storage systems.

In the below, by referring to FIG. 20, the migration method for an asynchronous remote copy pair is described by exemplifying a case where a plurality of asynchronous remote copy pairs are defined and formed among a plurality of source volumes in the first primary storage system 120, and a plurality of destination volumes in the first secondary storage system 130. A plurality of asynchronous remote copy pairs are also defined and formed among a plurality of source volumes in the second primary storage system 120, and a plurality of destination volumes in the second secondary storage system 130. These source and destination volumes are belonging to any one specific MN consistency group 2100.

That is, out of the asynchronous remote copy pairs belonging to the MN consistency group 2100 defined in the first and second primary storage systems 120, and the first and second secondary storage systems 130, the migration method for an asynchronous remote copy pair is described by exemplifying a case of migrating an asynchronous remote copy pair established between the first primary storage system 120 and the first secondary storage system 130 to be an asynchronous remote copy pair between the second primary storage system 120 and the second secondary storage system 130.

Figure 20:
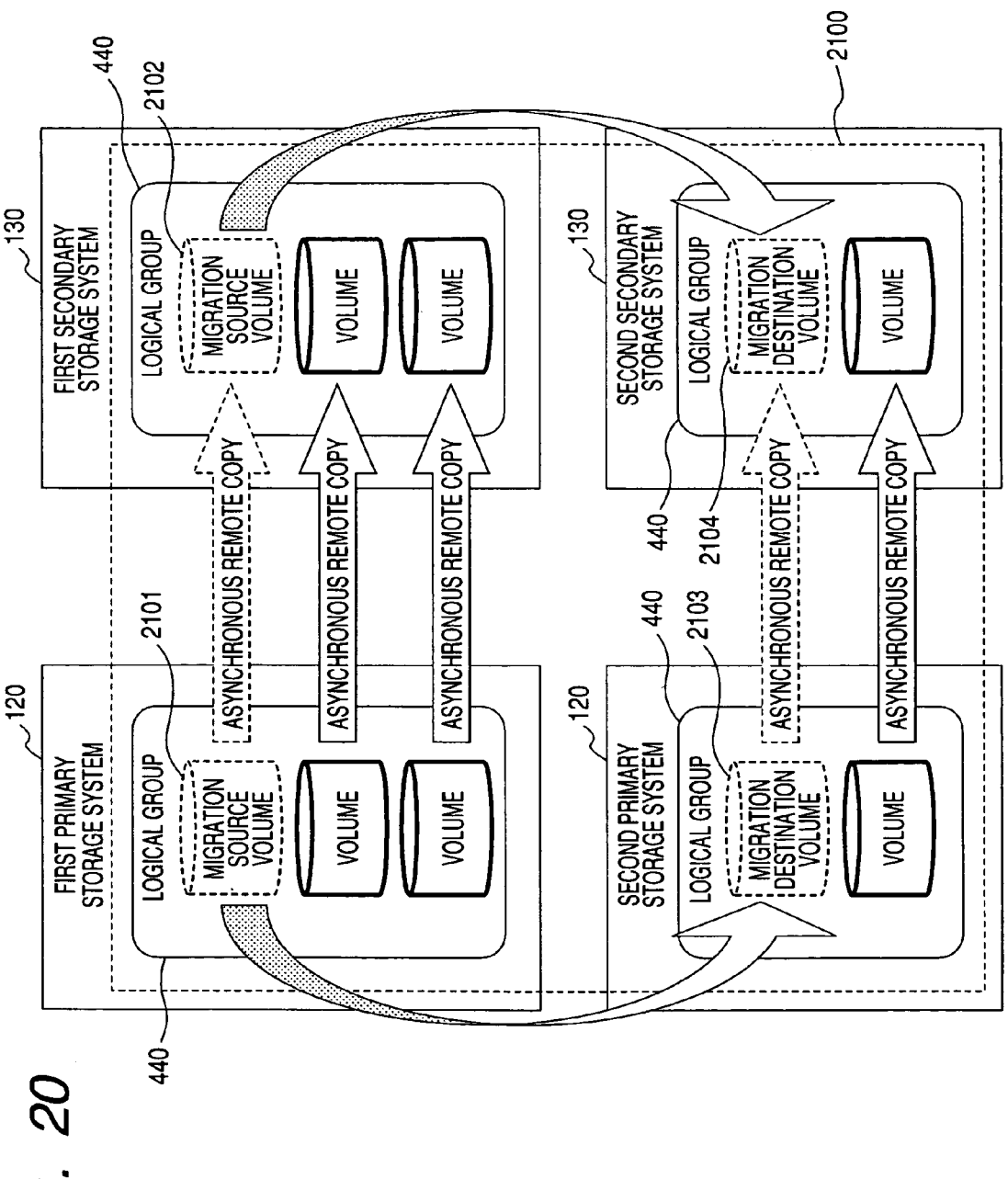
FIG. 20 is a diagram showing exemplary migration of an asynchronous remote copy pair.

To be more specific, by referring to FIG. 20, the migration method for an asynchronous remote copy pair is described by exemplifying a case of migrating an asynchronous remote copy pair between the migration source volumes 2101 and 2102 to an asynchronous remote copy pair between the migration destination volumes 2103 and 2104. In the below, the migration source volume 2101 is referred to as the migration source volume 2101 in the primary storage system, the migration destination volume 2103 as the migration destination volume 2103 in the primary storage system, the migration source volume 2102 as the migration source volume 2102 in the secondary storage system, and the migration destination volume 2104 as the migration destination volume 2104 in the secondary storage system.

In the present embodiment, The following is assumed to be a precondition. The logical group 440 including the migration source volume 2101 in the primary storage system, the logical group 440 including the migration destination volume 2103 in the primary storage system, the logical group 440 including the migration source volume 2102 in the secondary storage system, and the logical group 440 including the migration destination volume 2104 in the secondary storage system are all belonging to the same MN consistency group 2100.

Also in the present embodiment, the migration process is executed without deleting the migration-target asynchronous remote copy pair from the MN consistency group 2100, and without interrupting the asynchronous remote copy process from the primary site to the secondary site. This thus enables, with the data-write-sequence consistency among a plurality of storage systems for asynchronous remote copy, migration of an asynchronous remote copy pair among the storage systems without interrupting the asynchronous remote copy process from the primary site to the secondary site. Accordingly, even if a load increase in some primary and secondary storage systems causes difficulty in operations using those storage systems, asynchronous remote copy pair migration allows load balancing without interrupting the asynchronous remote copy process. Moreover, even if some primary and/or secondary storage system has to be stopped for its operation due to maintenance, migrating an asynchronous remote copy pair defined between the primary and secondary storage systems to other primary and secondary storage system enables maintenance without interrupting the asynchronous remote copy process.

Note here that FIG. 20 example is no more than an example, and the number of storage systems in the primary and secondary sites, the number of logical groups 440 in each of the storage systems, the number of volumes 442 in each of the logical groups 440, the number of logical groups 440 in the MN consistency group 2100, the number of migration-target asynchronous remote copy pairs, and the like, are not restricted to FIG. 20 example.

Figure 21:
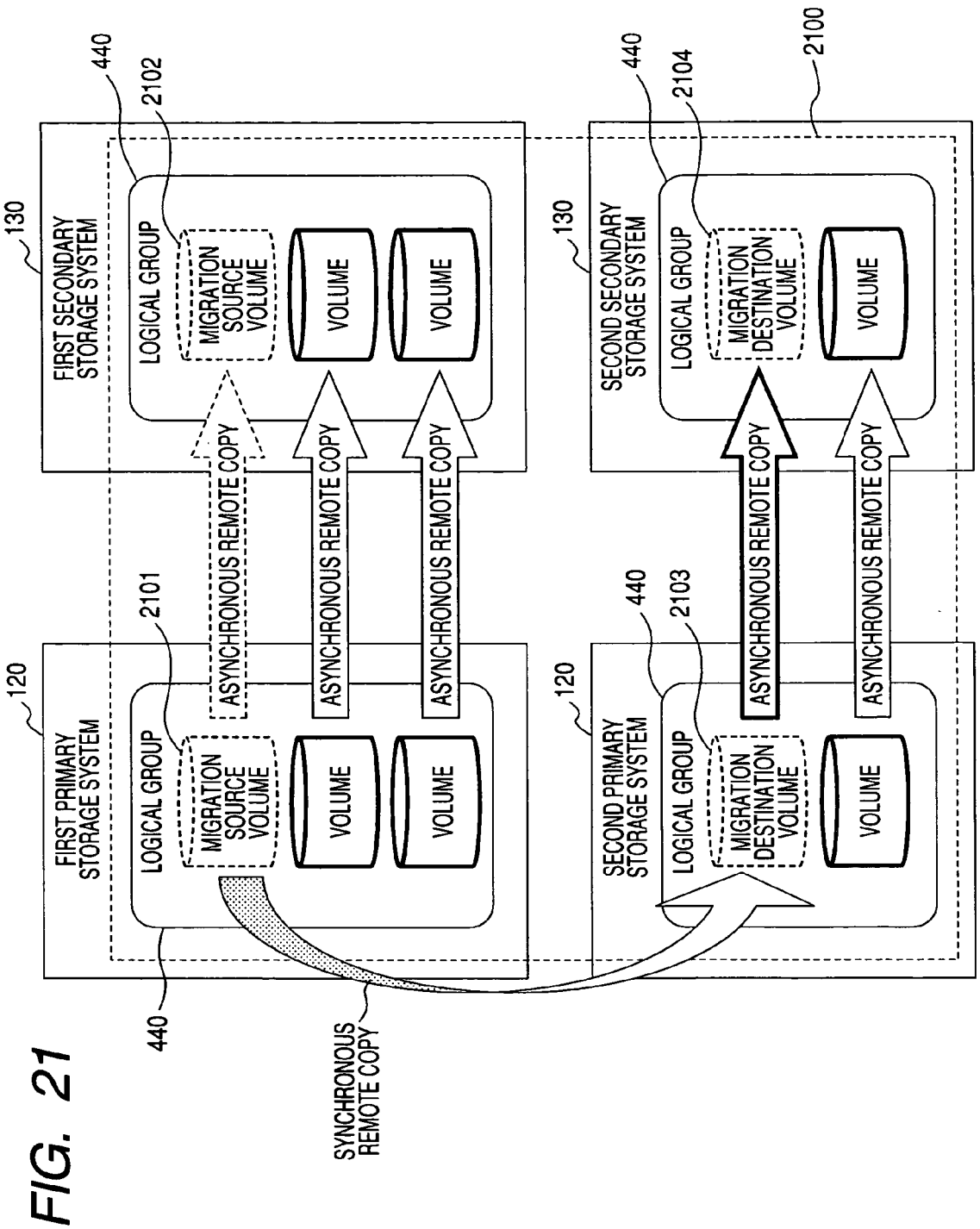
FIG. 21 is a diagram showing an exemplary migration method of an asynchronous remote copy pair.

FIG. 21 is a conceptual diagram showing an exemplary asynchronous remote copy pair migration process in the present embodiment. In the present embodiment, first of all, a synchronous remote copy pair is defined and formed between the migration source volume 2101 in the primary storage system and the migration destination volume 2103 in the primary storage system, and a synchronous remote copy process is executed so that the pair state is put to Duplex. Thereafter, an asynchronous remote copy pair is defined and formed between the migration destination volume 2103 in the primary storage system and the migration destination volume 2104 in the secondary storage system so that an asynchronous remote copy process is executed. After the asynchronous remote copy pair between the migration destination volume 2103 in the primary storage system and the migration destination volume 2104 in the secondary storage system transits Duplex in pair state, an I/O from the primary host to the migration source volume 2101 in the primary storage system is temporarily stopped. The synchronous remote copy pair is then deleted, and an I/O request issued by the primary host 110 is changed in destination from the migration source volume 2101 in the primary storage system to the migration destination volume 2103 in the primary storage system so that the I/O is resumed. Thereafter, the asynchronous remote copy pair between the migration source volume 2101 in the primary storage system and the migration source volume 2102 in the secondary storage system is deleted.

FIG. 22 is a flowchart showing an exemplary asynchronous remote copy pair migration method in the present embodiment. The process of FIG. 22 is assumed to be executed by the management software 214 in the primary host 110 for the description below. As an alternative to the host, the storage system may be in charge of the process with the functions for executing such a process stored in the memory 122. Still alternatively, the process may be executed by the management software 214 provided in the secondary host 140, or the management software 214 provided in a management computer (not shown) connected to the management network 150.

The management software 214 receives the following IDs as parameters from users of the primary host 110 or others at the time of process execution. The IDs include: the ID of the migration source volume 2101 in the primary storage system; the ID of the logical group 440 including the migration source volume 2101 in the primary storage system; the ID of the migration destination volume 2103 in the primary storage system; the ID of the logical group 440 including the migration destination volume 2103 in the primary storage system; the ID of the migration source volume 2102 in the secondary storage system; the ID of the logical group 440 including the migration source volume 2102 in the secondary storage system; the ID of the migration destination volume 2104 in the secondary storage system; the ID of the logical group 440 including the migration destination volume 2104 in the secondary storage system; the ID of the first primary storage system 120 including the migration source volume 2101 in the primary storage system; the ID of the second primary storage system 120 including the migration destination volume 2103 in the primary storage system; the ID of the first secondary storage system 130 including the migration source volume 2102 in the secondary storage system; and the ID of the second secondary storage system 130 including the migration destination volume 2104 in the secondary storage system.

In step 1901, the management software 214 forwards a command to the first and second primary storage systems 120. The command is to define and form a synchronous remote copy pair whose source volume is the migration source volume 2101 in the primary storage system, and destination volume is the migration destination volume 2103 in the primary storage system. This command is received by the remote copy information change program 730 in the respective primary storage systems 120.

Figure 23A:
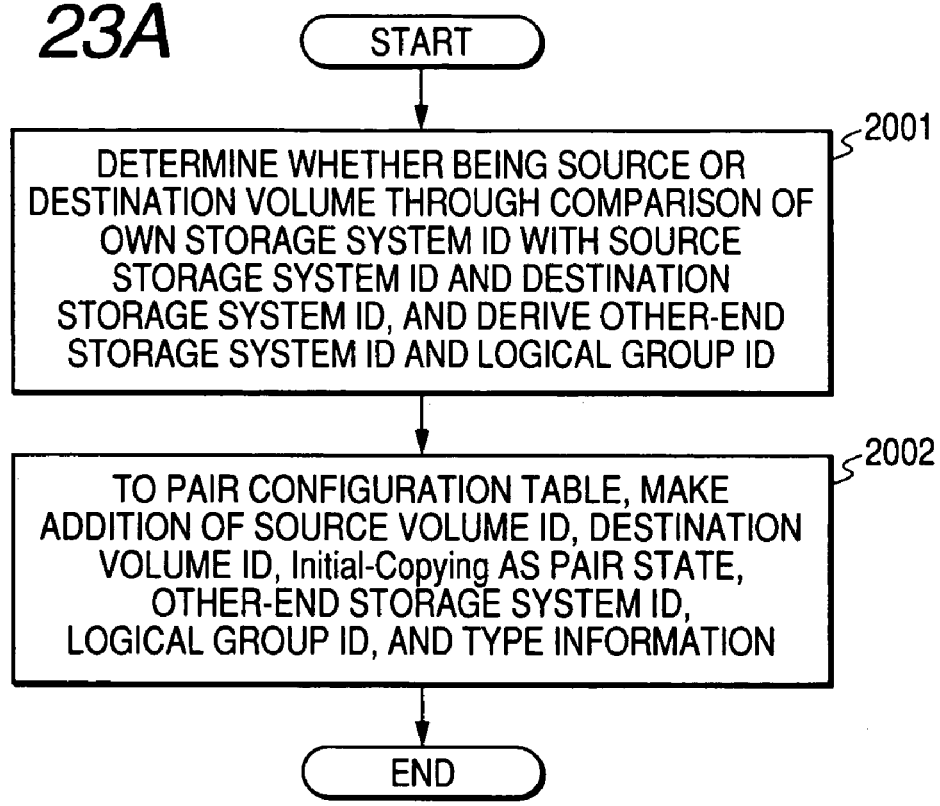
FIG. 23 A and FIG. 23 B are diagrams showing an exemplary process to be executed by a remote copy information change program.
Figure 23B:
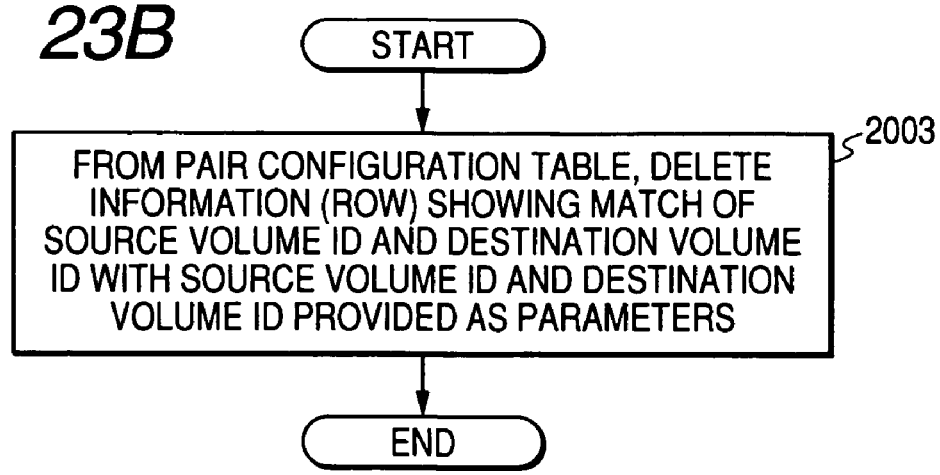

FIG. 23 shows an exemplary process for the remote copy information change program 730 in the storage system. Toward the remote copy information change program 730, the management software 214 issues a request for defining or deleting a synchronous or asynchronous remote copy pair. In accordance with the details of the request issued by the management software 214 as such, the remote copy information change program 730 executes the processes of steps 2001 and 2002 of the FIG. 23 A to define and form a remote copy pair, and executes the process of step 2003 of the FIG. 23 B to delete a remote copy pair.

When the management software 214 issues a request for defining or deleting a remote copy pair, the remote copy information change program 730 is provided with the following IDs as parameters. The IDs include: the ID of the source storage system, the ID of the destination storage system, the ID of the source volume, the ID of the destination volume, the logical group ID including the source volume, the logical group ID including the destination volume, and the remote copy type.

After receiving the request for defining a remote copy pair in step 2001, the remote copy information change program 730 makes a determination whether being a source or destination storage system. Such a determination is made by comparing the ID of its own storage system with the IDs of the source and destination storage systems provided by the management software 214 as parameters. Based on the determination result and the received parameters, the remote copy information change program 730 specifies the other-end storage system ID and the logical group ID.

In step 2002, the remote copy information change program 730 makes an addition to the PAIR configuration table 422 of information (row) including the source and destination volume IDs, Initial-Copying as pair state, the other-end storage system ID, the logical group ID, and the type.

On the other hand, when the request received from the management software 214 is the one for deleting a remote copy pair, the remote copy information change program 730 searches the PAIR configuration table 422 in step 2003 to find the row showing a match of the source and destination volume IDs with the source and destination volume IDs received by the management software 214 as parameters. The information in thus found row is deleted from the PAIR configuration table 422.

After step 2002 or 2003 is through, the contents of the PAIR configuration table 422 are changed. Thereafter, based on thus changed contents of the PAIR configuration table 422, the processes for the write reception program 412, the write execution program 413, the remote copy program 414, and the arbitrator 416 are to be executed. Accordingly, by the remote copy information change program 730 changing the contents of the PAIR configuration table 422, the change is occurred in the process executed by the first and second primary storage systems 120, and the first and second secondary storage systems 130.

Referring back to FIG. 22, in step 1902, the management software 214 refers to the PAIR configuration table 422 in the first and that in the second primary storage systems 120 over the management network 150. Then, the management software 214 waits until the synchronous remote copy pair between the migration source volume 2101 in the primary storage system and the migration destination volume 2103 in the primary storage system transits Duplex in pair state.

After the synchronous remote copy pair transits Duplex in pair state, in step 1903, the management software 214 then forwards a command to the second primary storage system 120 and the second secondary storage system 130. The command is to define and form an asynchronous remote copy pair whose source volume is the migration destination volume 2103 in the primary storage system, and destination volume is the migration destination volume 2104 in the secondary storage system. This command is accepted by the remote copy information change program 730 in the second primary storage system 120 and that in the second secondary storage system 130. By the process described by referring to FIG. 23, an asynchronous remote copy pair is defined and formed.

In step 1904, the management software 214 refers to the PAIR configuration table 422 in the second primary storage system 120 and that in the second secondary storage system 130 over the management network 150. Then, the management software 214 waits until the asynchronous remote copy pair between the migration destination volume 2103 in the primary storage system and the migration destination volume 2104 in the secondary storage system transits Duplex in pair state.

In step 1905, the management software 214 issues a command to the primary host 110 not to issue an I/O request to the migration source volume 2101 in the primary storage system. The primary host 110 accordingly stops issuing the I/O request to the migration source volume 2101 in the primary storage system.

In step 1906, the management software 214 forwards a command to the first and second primary storage systems 120 to delete the synchronous remote copy pair between the migration source volume 2101 in the primary storage system and the migration destination volume 2103 in the primary storage system. After accepting such a command, in the first and second primary storage systems 120, the remote copy information change program 730 executes the process in step 2003 of FIG. 23 so that the synchronous remote copy pair specified by the management software 214 is accordingly deleted.

In step 1907, the management software 214 issues a command to the primary host 110 to change the volume ID in the migration source volume 2101 in the primary storage system to the volume ID of the migration destination volume 2103 in the primary storage system. Here, the migration source volume 2101 is entered in a volume management table (not shown) in the primary host 110 as a destination of the I/O request. The primary host 110 accordingly updates the volume ID based on the command, and also changes the destination of the I/O request from the migration source volume 2101 in the primary storage system to the migration destination volume 2103 in the primary storage system so that issuance of the I/O request is resumed.

In step 1908, the management software 214 forwards a command to the first primary storage system 120 and the first secondary storage system to delete the asynchronous remote copy pair between the migration source volume 2101 in the primary storage system and the migration destination volume 2102 in the secondary storage system. After receiving such a command, in the first primary storage system 120 and the first secondary storage system 130, the remote copy information change program 730 executes the process in step 2003 of FIG. 23 so that asynchronous remote copy pair specified by the management software 214 is accordingly deleted.

In such a method as described above, an asynchronous remote copy pair defined and formed between specific primary storage system 120 and secondary storage system 130 can be migrated to be an asynchronous remote copy pair between any other primary storage system 120 and secondary storage system 130. Such migration is performed without interrupting the remote copy process from the primary site to the secondary site with the data-write-sequence consistency in the MN consistency group 2100.

Note that, from steps 1901 to 1904, if the write request 300 directed to the migration source volume 2101 in the primary storage system issued by the primary host 110, the first primary storage system 120 accepts the write request 300. This is because any one of the states of Initial-Copying, Duplex-Pending, and Duplex is applicable to the pair state of the asynchronous remote copy pair between the migration source volume 2101 in the primary storage system and the migration source volume 2102 in the secondary storage system, the pair state of the synchronous remote copy pair between the migration source volume 2101 in the primary storage system and the migration destination volume 2103 in the primary storage system, and the pair state of the asynchronous remote copy pair between the migration destination volume 2103 in the primary storage system and the migration destination volume 2104 in the secondary storage system.

At the time of step 1904, if a write request issued by the primary host 110 to the migration source volume 2101 in the primary storage system, the write execution program 413 in the first primary storage system 120 writes the write data 320 into the migration source volume 2101 in the primary storage system. At the same time, the write execution program 413 invokes the synchronous remote copy program 710 so that the write request 300 including the write data 320 is forwarded from the first primary storage system 120 to the second primary storage system 120. The updated data creation program 727 in the asynchronous remote copy program 720 is also invoked so that the write data 320 is written also to the migration source volume 2102 in the secondary storage system by the asynchronous remote copy process. In the second primary storage system 120 accepting the write request 300 through synchronous remote copy by the first primary storage system 120, the write execution program 413 writes the write data 320 to the migration destination volume 2103 in the primary storage system. Further, in the second primary storage system 120, the updated data creation program 727 in the asynchronous remote copy program 720 is invoked based on the write request 300 received from the first primary storage system 120, and thereafter, by the above-described asynchronous remote copy process, the write data 320 is written also to the migration destination volume 2104 in the secondary storage system.

After step 1905 is through, no I/O request is issued toward the migration source volume 2101 in the primary storage system. Accordingly, no data copy process is executed between the migration source volume 2101 in the primary storage system and the migration destination volume 2103 in the primary storage system, and between the migration source volume 2101 in the primary storage system and the migration source volume 2102 in the secondary storage system. Thereafter, the asynchronous remote copy process is executed for the asynchronous remote copy pair between the migration destination volume 2103 in the primary storage system and the migration destination volume 2104 in the secondary storage system.

In FIG. 21 example and FIG. 22 example, the remote copy mode between the migration source volume 2101 in the primary storage system and the migration destination volume 2103 in the primary storage system is synchronous remote copy. This is not restrictive, and the present embodiment can be surely implemented with asynchronous remote copy. Described below is an exemplary process in such a case, only differences from the above examples with synchronous remote copy.

First in step 1901 of FIG. 22, a command is issued to define and form an asynchronous remote copy pair between the migration source volume 2101 in the primary storage system and the migration destination volume 2103 in the primary storage system. Then in step 1902, the management software 214 waits until the asynchronous remote copy pair defined in step 1901 transits Duplex in pair state.

In step 1906, the management software 214 issues a command to put the pair state of the asynchronous remote copy pair between the migration source volume 2101 in the primary storage system and the migration destination volume 2103 in the primary storage system to Suspend.

After receiving such a command, in the first primary storage system 120, the data transfer program 722 performs data transfer to the second primary storage system 120. Here, transferred is the not-yet-transferred updated data 600 relating to the migration source volume 2101 in the primary storage system stored in the updated data storage unit 426 in the first primary storage system 120. After the not-yet-transferred updated data 600 is transferred from the first primary storage system 120 to the second primary storage system 120, the first primary storage system 120 forwards the empty updated data 600 (not including the write data 320 or others) indicating a Suspend command so that the second primary storage system 120 is notified of Suspend. Thereafter, the first primary storage system 120 puts, to Suspend, the pair state of the asynchronous remote copy pair found in the PAIR configuration table 422. When the second primary storage system detect such empty updated data 600 indicating the Suspend command, the second primary storage system 120 puts, to Suspend, the pair state of the asynchronous remote copy pair found in the PAIR configuration table 422. To update the PAIR configuration table 422, the remote copy information change program 730 in each of the storage systems is in charge. By executing the above-described process, the asynchronous remote copy pair is changed in pair state into Suspend.

Through reference to the PAIR configuration table 422 for the first and second primary storage systems 120 over the management network 150, the management software 214 checks whether the asynchronous remote copy pair between the migration source volume 2101 in the primary storage system and the migration destination volume 2103 in the primary storage system is Suspend in pair state. After checking that the pair state is in Suspend, the management software 214 issues a command to delete the asynchronous remote copy pair.

The remaining process is similar to the case for synchronous remote copy.

Second Embodiment

In the first embodiment, as a precondition before the process for asynchronous remote copy pair migration, the logical group 440 including the migration destination volume 2103 in the primary storage system and the logical group 440 including the migration destination volume 2104 in the secondary storage system are assumed to be in the same MN consistency group as the MN consistency group 2100. The MN consistency group 2100 is the one including the logical group 400 including the migration source volume 2101 in the primary storage system and the logical group 440 including the migration source volume 2102 in the secondary storage system.

In a second embodiment, described is a procedure for asynchronous remote copy pair migration in a case where, before starting the process for the asynchronous remote copy pair migration, the logical group 440 including the migration destination volume 2103 in the primary storage system and the logical group 440 including the migration destination volume 2104 in the secondary storage system are not yet in the same MN consistency group 2100 including the logical group 440 including the migration source volume 2101 in the primary storage system and the logical group 440 including the migration source volume 2102 in the secondary storage system.

In the below, only differences from the first embodiment are mainly described. The structure and process not described below are those similar to the first embodiment.

Figure 24:
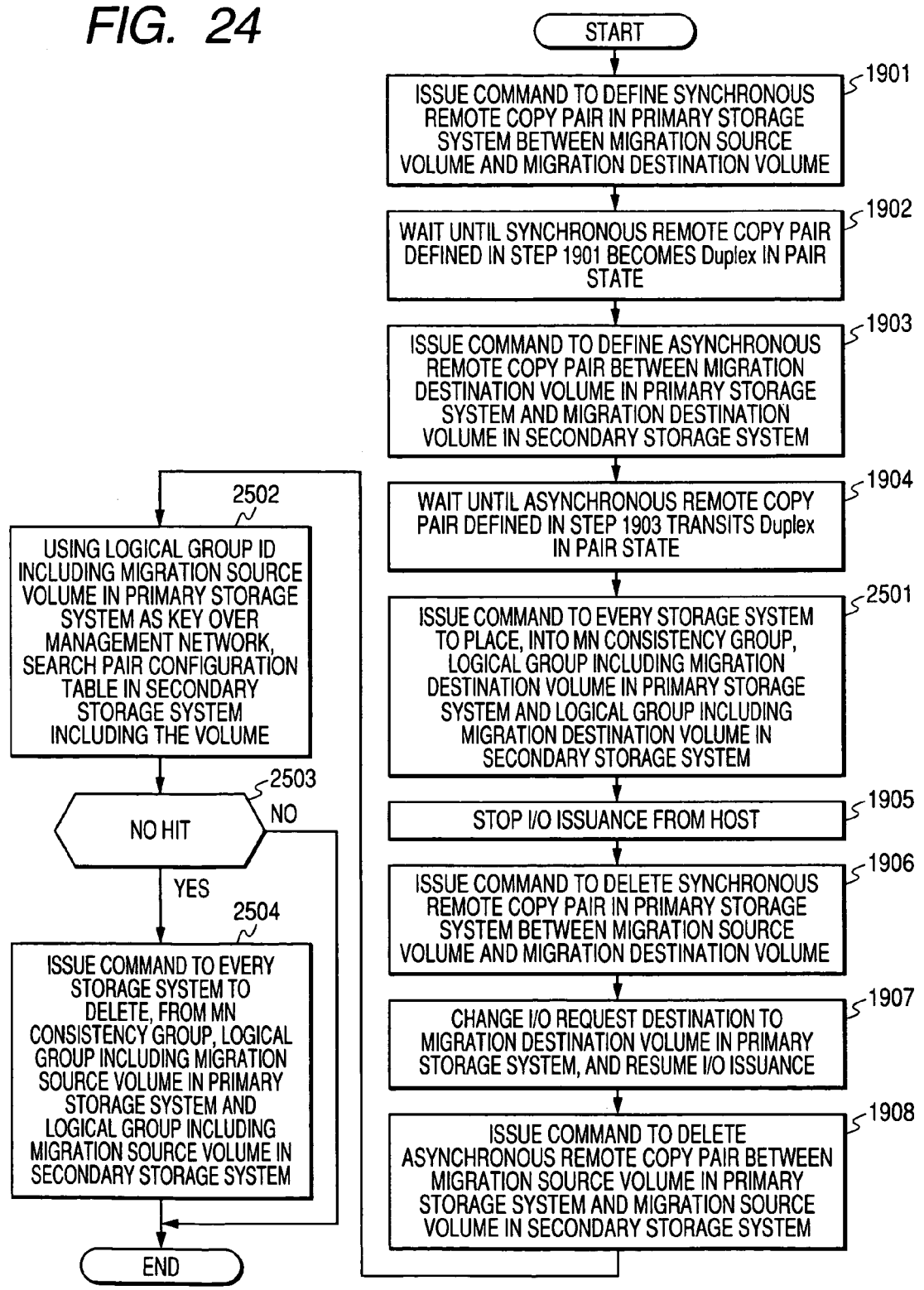
FIG. 24 is a flowchart showing another exemplary migration process for an asynchronous remote copy pair.

FIG. 24 shows an exemplary asynchronous remote copy pair migration process in the present embodiment. The process of FIG. 24 is the one partially different from the process of FIG. 22.

Note that the process of FIG. 24 is assumed to be executed by the management software 214 in the primary host 110. This is surely not restrictive, and as an alternative to the host, the storage system may be in charge of the process with functions for executing such a process stored in the memory 122. Still alternatively, the process may be executed by the management software 214 provided in the secondary host 140, or the management software 214 provided in a management computer (not shown) connected to the management network 150.

The management software 214 receives the following IDs as parameters at the time of process execution. The IDs include: the ID of the migration source volume 2101 in the primary storage system; the ID of the logical group including the migration source volume 2101 in the primary storage system; the ID of the migration destination volume 2103 in the primary storage system; the ID of the logical group including the migration destination volume 2103 in the primary storage system; the ID of the migration source volume 2102 in the secondary storage system; the ID of the logical group including the migration source volume 2102 in the secondary storage system; the ID of the migration destination volume 2104 in the secondary storage system; the ID of the logical group including the migration destination volume 2104 in the secondary storage system; the ID of the first primary storage system 120 including the migration source volume 2101 in the primary storage system; the ID of the second primary storage system 120 including the migration destination volume 2103 in the primary storage system; the ID of the first secondary storage system including the migration source volume 2102 in the secondary storage system; the ID of the second secondary storage system including the migration destination volume 2104 in the secondary storage system; and the MNCTG ID of the MN consistency group 2100 including the migration source volume 2101 in the primary storage system and the migration source volume 2102 in the secondary storage system.

The processes from steps 1901 to 1904 are the same as those of FIG. 22.

In the present embodiment, after step 1904, as step 2501, the management software 214 issues a command to the remote copy information change program 730 in each of the primary and secondary storage systems 120 and 130. The command is to make an addition to the MN consistency group 2100 the logical group 440 including the migration destination volume 2103 in the primary storage system, and the logical group 440 including the migration destination volume 2104 in the secondary storage system. At this time, the management software 214 forwards, as parameters, the MNCTG ID, the IDs of the logical group 440 including the migration destination volume 2104 in the secondary storage system and the logical group 440 including the migration destination volume 2103 in the primary storage system, the ID of the second secondary storage system 130 including the migration destination volume 2104 in the secondary storage system, and the ID of the second primary storage system 120 including the migration destination volume 2103 in the primary storage system. The process of the remote copy information change programs 730 after accepting such a command will be described later.

The processes of steps 1905 to 1908 to be executed after step 2501 will be the same as those of FIG. 22.

After step 1908, as step 2502, the management software 214 refers to the contents of the PAIR configuration table 422 in the first primary storage system 120 over the management network 150 to check, as step 2503, whether the logical group 440 including the migration source volume 2101 in the primary storage system has any other volume(s) 442.

When there is no other volume 442 in step 2503, i.e., when "yes", the procedure goes to step 2504. When there is any other volume(s) in step 2503, i.e., when "no", the procedure skips step 2504 to end the process.

In step 2504, the management software 214 issues a command to the remote copy information change program 730 in each of the primary and secondary storage systems 120 and 130. The command is to delete from the MN consistency group 2100 both the logical group 440 including the migration source volume 2101 in the primary storage system, and the logical group 440 including the migration source volume 2102 in the secondary storage system. At this time, the remote copy information change programs 730 are each provided with, as parameters, the ID of the logical group 440 including the migration source volume 2101 in the primary storage system, the ID of the logical group 440 including the migration source volume 2102 in the secondary storage system, the ID of the first primary storage system including the migration source volume 2101 in the primary storage system, and the ID of the first secondary storage system including the migration source volume 2102 in the secondary storage system. The process of the remote copy information change programs 730 after receiving such a command will be described later. This is the end of the process for the management software 214.

Figure 25A:
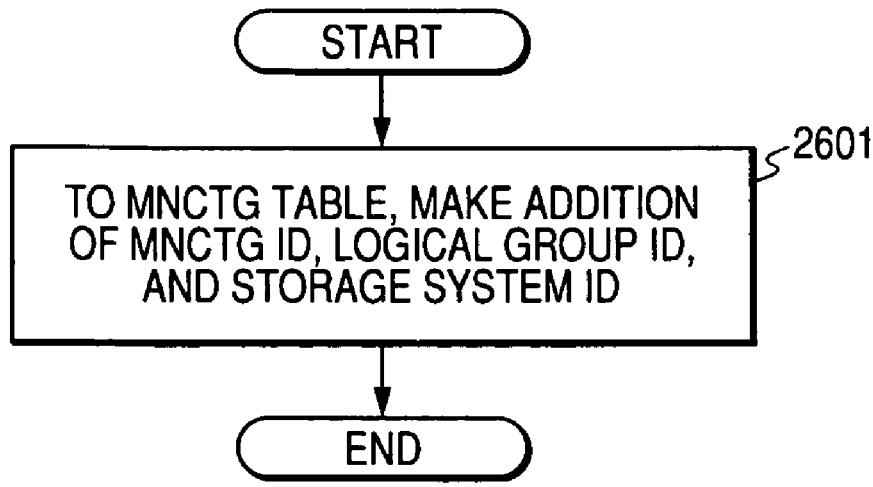
FIG. 25 A and FIG. 25 B are diagrams showing another exemplary process to be executed by the remote copy information change program.
Figure 25B:
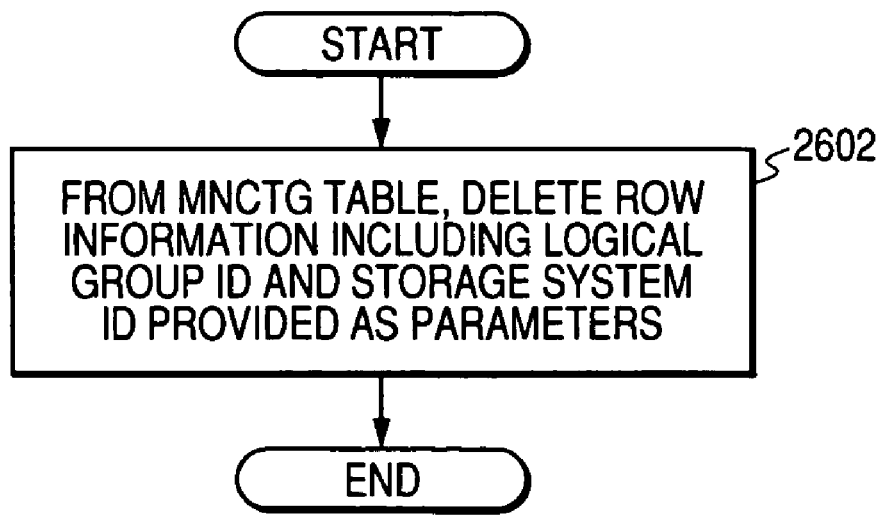

By referring to FIG. 25, described next is another exemplary process for the remote copy information change program 730. The process of FIG. 25 is an exemplary process for the command issued by the management software 214 in step 2501 and step 2504 of FIG. 24. When accepting a command for adding the logical groups 440 to the MN consistency group, the remote copy information change program 730 executes the process in step 2601 of FIG. 25A. When accepting a command for deleting the logical groups 440 from the MN consistency group, the remote copy information change program 730 executes the process in step 2602 of FIG. 25B.

In step 2601, the remote copy information change program 730 adds, to the MNCTG table 424, the MNCTG ID, the logical group ID, and the storage system ID, those of which are provided as parameters.

In step 2602, the remote copy information change program 730 searches the MNCTG table 424 using as keys the parameters of logical group ID and storage system ID. The row including thus found logical group ID and storage system ID is deleted from the MNCTG table 424 so that delete the logical groups 440 specified by the MN consistency group.

Such a process as above enables asynchronous remote copy pair migration to any logical group not as a part of the MN consistency group. What is more, after asynchronous remote copy pair migration, if there is no more need to keep a logical group including a migration source volume in a secondary storage system, the logical group can be deleted from the MN consistency group.

Note here that, similarly to the first embodiment, asynchronous remote copy also serves well as a remote copy mode between the migration source volume 2101 in the primary storage system and the migration destination volume 2103 in the primary storage system.

Third Embodiment

Next, as another embodiment of the present invention, described is an asynchronous remote copy pair migration method, in which data amount transmitted by asynchronous remote copy processes for the asynchronous remote copy pair migration can be reduced comparing with the first and second embodiments.

This is achieved by performing a data copy process to the migration destination volume 2104 in the secondary storage system from the migration source volume 2102 in the secondary storage system. In a third embodiment, only differences from the first embodiment are described. The structure and process not described below are those similar to the first embodiment.

Figure 26:
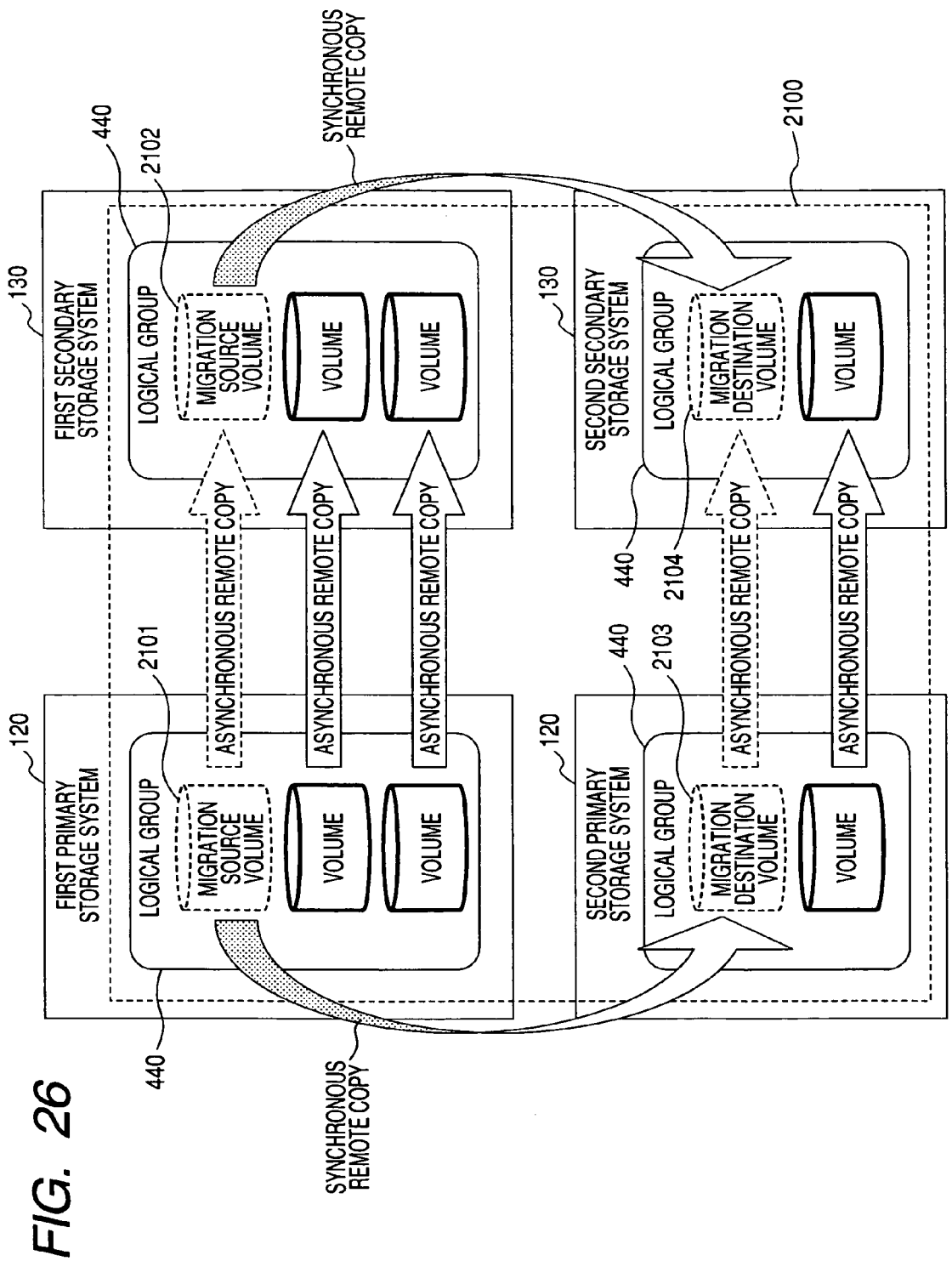
FIG. 26 is a diagram showing another exemplary migration method for an asynchronous remote copy pair.

FIG. 26 is a conceptual diagram showing an exemplary method for asynchronous remote copy pair migration of the third embodiment. In the present embodiment, first of all, a synchronous remote copy pair is defined and formed between the migration source volume 2101 in the primary storage system and the migration destination volume 2103 in the primary storage system, and another synchronous remote copy pair is defined and formed between the migration source volume 2102 in the secondary storage system and the migration destination volume 2104 in the secondary storage system. A synchronous remote copy process is then executed to those synchronous remote copy pairs so that their pair state is put to Duplex. Thereafter, an I/O from the primary host 110 to the migration source volume 2101 in the primary storage system is temporarily stopped to put, to Suspend, the pair state of the asynchronous remote copy pair between the migration source volume 2101 in the primary storage system and the migration source volume 2102 in the secondary storage system. Then, the synchronous remote copy pair defined and formed between the migration source volume 2101 in the primary storage system and the migration destination volume 2103 in the primary storage system, and the synchronous remote copy pair between the migration source volume 2102 in the secondary storage system and the migration destination volume 2104 in the secondary storage system are both deleted. Thereafter, an asynchronous remote copy pair is defined and formed between the migration destination volume 2103 in the primary storage system and the migration destination volume 2104 in the secondary storage system, and the pair state of thus defined asynchronous remote copy pair is put to Duplex without executing initial copy. Thereafter, the destination of the I/O request issued by the primary host 110 is changed from the migration source volume 2101 to the migration destination volume 2103 in the primary storage system. After such a destination change, the process is started to the I/O request issued by the primary host 110 toward the migration destination volume 2103 in the primary storage system. Lastly, the asynchronous remote copy pair between the migration source volume 2101 in the primary storage system and the migration source volume 2102 in the secondary storage system is deleted.

Figure 27:
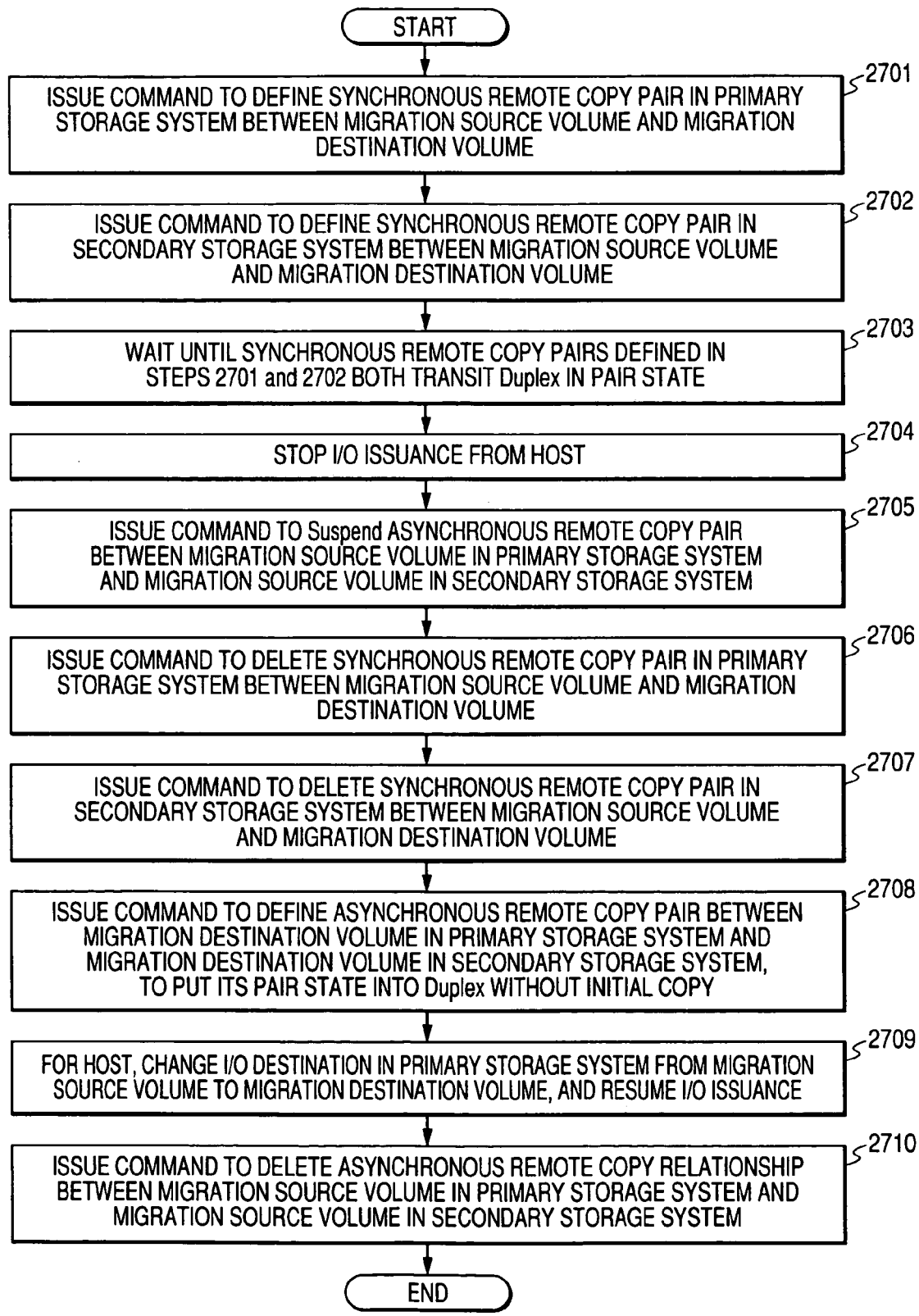
FIG. 27 is a flowchart showing still another exemplary migration process for an asynchronous remote copy pair.

FIG. 27 is a diagram showing an exemplary process for asynchronous remote copy pair migration in the present embodiment. Note that the process of FIG. 27 is assumed to be executed by the management software 214 in the primary host 110. This is not restrictive, and as an alternative to the host, the storage system may be in charge of the process with functions for executing such a process stored in the memory 122. Still alternatively, the process may be executed by the management software 214 provided in the secondary host 140, or the management software 214 provided in a management computer (not shown) connected to the management network 150.

In step 2701, the management software 214 issues a command to the first and second primary storage systems 120. The command is to define and form a synchronous remote copy pair whose source volume is the migration source volume 2101 in the primary storage system, and destination volume is the migration destination volume 2103 in the primary storage system. In step 2702, the management software 214 issues another command to the first and second secondary storage systems 130. The command is to define and form a synchronous remote copy pair whose source volume is the migration source volume 2102 in the secondary storage system, and destination volume is the migration destination volume 2104 in the secondary storage system.

In the storage systems each accepted such a command for defining a synchronous remote copy pair from the management software 214 in step 2701 or 2702, the remote copy information change program 730 is invoked so that the processes in steps 2001 and 2002 described by referring to FIG. 23 are executed.

In step 2703, the management software 214 then refers to the PAIR configurations table 422 in each of the first and second primary second apparatuses 120, and the first and second secondary storage systems 130 over the management network 150, and waits until both the synchronous remote copy pairs defined in steps 2701 and 2702 transit Duplex in pair state.

When both of the two synchronous remote copy pairs transit Duplex in pair state in step 2703, the write request 300 is issued from the primary host 110 to the migration source volume 2101 in the primary storage system. In response thereto, in the first primary storage system 120, the write execution program 413 writes the write data 320 to the migration source volume 2101 in the primary storage system. The write execution program 413 also invokes the synchronous remote copy program 710 so that the write request 300 including the write data 320 is forwarded from the first primary storage system 120 to the second primary storage system 120. In the second primary storage system 120, the write execution program 413 writes the write data 320 to the migration destination volume 2103 in the primary storage system based on the write request 300 provided by the first primary storage system 120.

In the first storage system 120, the updated data creation program 721 is activated so that the updated data 600 including the write data 320 is created. The resulting updated data 600 is forwarded by the data transfer program 722 to the first secondary storage system 130. In the first secondary storage system 130, the MN restore program 726 and the write execution program 413 write the write data 320 in the updated data 600 to the migration source volume 2102 in the secondary storage system. Moreover, the write execution program 413 invokes the synchronous remote copy program 710 so that the write request 300 including the write data 320 is forwarded from the first secondary storage system 130 to the second secondary storage system 130. In the second secondary storage system 130, the write execution program 413 writes the write data 320 to the migration destination volume 2104 in the secondary storage system based on the write request 300 provided by the first secondary storage system 130.

Referring back to FIG. 27, in step 2704, the management software 214 issues a command to the primary host 110 not to issue an I/O request against the migration source volume 2101 in the primary storage system.

In step 2705, the management software 214 issues a command to the first primary storage system 120 to put, to Suspend, the pair state of the asynchronous remote copy pair between the migration source volume 2101 in the primary storage system and the migration source volume 2102 in the secondary storage system.

After receiving such a command, in the first primary storage system 120, the data transfer program 727 performs data transfers to the first secondary storage system 130. Here, transferred is the not-yet-transferred updated data 600 relating to the migration destination volume 2101 in the primary storage system stored in the updated data storage unit 426 in the first primary storage system 120. After the not-yet-transferred updated data 600 is transferred from the first primary storage system 120 to the first secondary storage system 130, the first primary storage system 120 forwards the empty updated data 600 (not including the write data 320 or others) indicating a Suspend command so that the first secondary storage system 130 is notified of Suspend.

Thereafter, the first primary storage system 120 puts, to Suspend, the pair state of the asynchronous remote copy pair found in the PAIR configuration table 422. When the first secondary storage system detect such empty updated data 600 indicating the suspend command, the first secondary storage system 130 puts, to Suspend, the pair state of the asynchronous remote copy pair in the PAIR configuration table 422. To update the PAIR configuration table 422, the remote copy information change program 730 in each of the storage systems is in charge. By executing the above-described process, the asynchronous remote copy pair is changed in pair state into Suspend.

In step 2706, the management software 214 issues a command to the first and second primary storage systems 120. The command is to delete the synchronous remote copy pair between the migration source volume 2101 in the primary storage system and the migration destination volume 2103 in the primary storage system. In step 2707, the management software 214 issues another command to the first and second secondary storage systems 130. The command is to delete the synchronous remote copy pair between the migration source volume 2102 in the secondary storage system and the migration destination volume 2104 in the secondary storage system.

In the storage systems each accepted such a command for deleting a synchronous remote copy pair from the management software 214 in step 2706 or 2707, the remote copy information change program 730 is invoked so that the process in step 2003 described by referring to FIG. 23 is executed.

In step 2708, the management software 214 issues a command to the second primary storage system and the second secondary storage system to instruct them to define and form an asynchronous remote copy pair whose source volume is the migration destination volume 2103 in the primary storage system, and destination volume is the migration destination volume 2104 in the secondary storage system. This command also instruct them to make the pair state of the defined asynchronous remote copy pair Duplex without executing initial copy for the asynchronous remote copy pair.

After accepting such a command, in the second primary storage system 120 and the second secondary storage system 130, their remote copy information change programs 730 accordingly change the corresponding PAIR configuration table 422. Such a process will be described later.

In step 2708, instead of commanding to put the pair state of the asynchronous remote copy pair to Duplex without initial copy as above, as in steps 1903 and 1904 of FIG. 22 in the first embodiment, the management software 214 may issue a simple command to define and form an asynchronous remote copy pair between the migration destination volume 2103 in the primary storage system and the migration destination volume 2104 in the secondary storage system, and wait until the asynchronous remote copy pair transits Duplex in pair state. With this being the case, thus commanded first primary storage system 120 and the second secondary storage system 130 execute the processes similar to those in the first embodiment so that initial copy is accordingly executed.

After the PAIR configuration table 422 is changed in step 2708, the processes for the second primary storage system 120 and the second secondary storage system 130 are accordingly changed. To be specific, if the write request 300 is issued to the migration destination volume 2103 in the primary storage system after the change of the PAIR configuration table 422, the updated data creation program 721 is invoked by the write execution program 413 in the second primary storage system 120. As a result, created is the updated data 600 including the write data 320 found in the write request 300. The resulting updated data 600 is forwarded by the data transfer program 722 to the second secondary storage system 130, and the MN restore program 726 and the write execution program 413 in the second secondary storage unit 130 write the write data 320 to the migration destination volume 2104 in the secondary storage system.

In step 2709, the management software 214 then issues a command to the primary host 110 to change the destination of the I/O request from the migration source volume 2101 in the primary storage system to the migration destination volume 2103 in the primary storage system. In response thereto, the primary host 110 accordingly changes the destination of the I/O request in the volume management table, i.e., the ID of the migration source volume 2101 in the primary storage system, to the ID of the migration destination volume 2103 in the primary storage system. The primary host 110 then resumes issuance of the I/O request.

Lastly, in step 2710, the management software 214 issues a command to the first primary storage system 120 and the first secondary storage system 130. The command is to delete the asynchronous remote copy pair between the migration source volume 2101 in the primary storage system and the migration source volume 2102 in the secondary storage system. In the storage systems each received such a command for deleting the asynchronous remote copy pair in step 2710, the remote copy information change program 730 is executed so that the process in step 2003 described by referring to FIG. 23 is executed.

Figure 28:
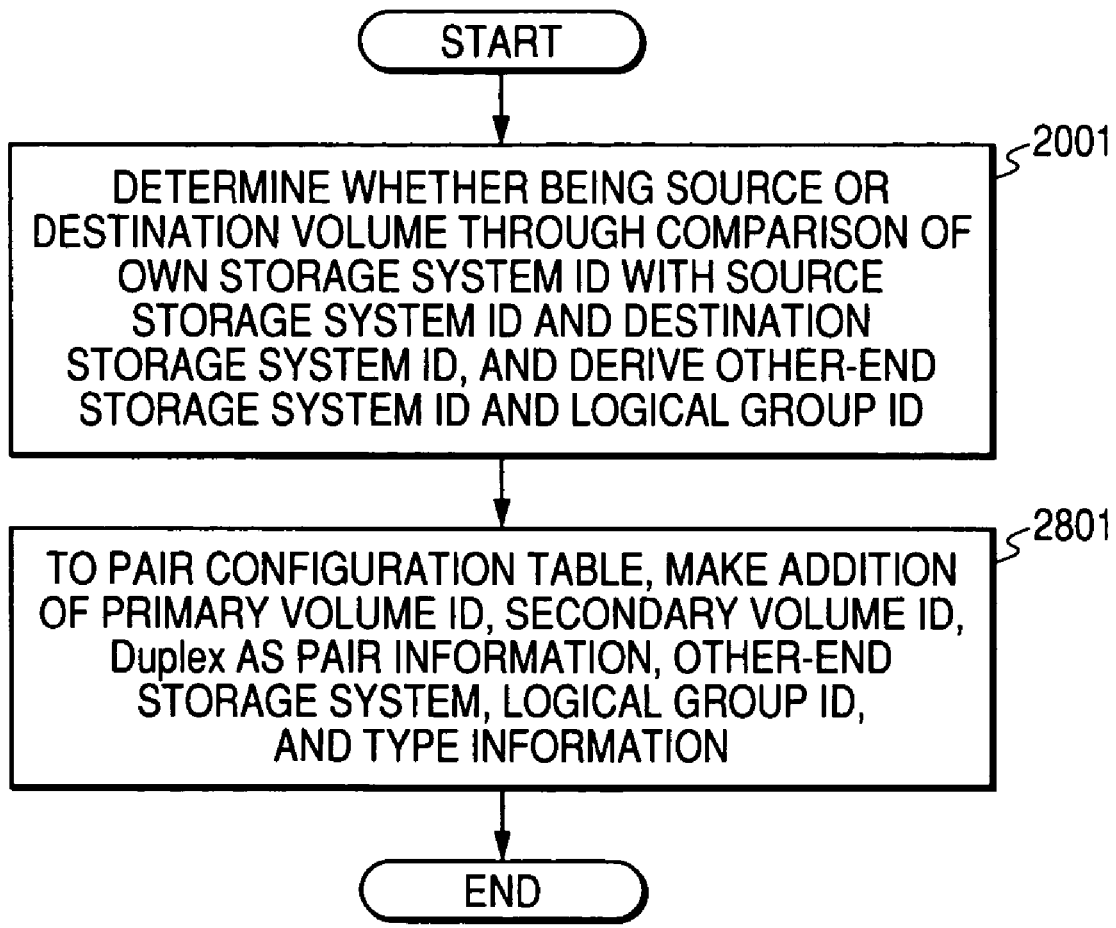
FIG. 28 is a diagram showing still another exemplary process to be executed by the remote copy information change program.

FIG. 28 is a diagram showing another exemplary process for the remote copy information change program 730. The process of FIG. 28 is to be executed by the remote copy information change program 730 when accepted a command to define and form a remote copy pair, and to put its pair state to Duplex without initial copy for the remote copy pair.

The remote copy information change program 730 first executes step 2001, which is the process similar to step 2001 of FIG. 23.

In step 2801, the remote copy information change program 730 makes an addition to the PAIR configuration table 422 of information (row) including the source volume ID, the destination volume ID, Duplex as pair state, the other-end storage system ID, the logical group ID, and the type. This is the end of the process.

As described in the foregoing, after step 2703 is through, the write data 320 in the write request 300 issued against the migration source volume 2101 in the primary storage system is copied into the migration destination volume 2103 in the primary storage system through a synchronous remote copy process, and also to the migration source volume 2102 in the secondary storage system through an asynchronous remote copy process. The write data 320 copied to the migration source volume 2102 in the secondary storage system is also copied to the migration destination volume 2104 in the secondary storage system through the synchronous remote copy process.

In step 2704, the primary host 110 stops issuance of the I/O request for the migration source volume 2101 in the primary storage system. After step 2705, asynchronous remote copy is not in operation due to the Suspend state between the migration source volume 2101 in the primary storage system and the migration source volume 2102 in the secondary storage system. Therefore, at the time of step 2708, the data in the migration destination volume 2103 in the primary storage system is already identical to the data in the migration destination volume 2104 in the secondary storage system. Therefore, there is no more need to execute initial copy to start asynchronous remote copy. Accordingly, in the present embodiment, in addition to the advantages achieved in the first embodiment, there is another advantage that it is not necessary to execute initial copy to make the state of the migration destination asynchronous remote copy pair Duplex. Therefore, the processing load for the initial copy between the primary and secondary sites can be successfully reduced.

Here, in the third embodiment, as a precondition similarly to the first embodiment, the MN consistency group 2100 including the logical group 440 including the migration source volume 2101 in the primary storage system and the logical group 440 including the migration source volume 2102 in the secondary storage system already includes the logical group 440 including the migration destination volume 2103 in the primary storage system and the logical group 440 including the migration destination volume 2104 in the secondary storage system.

Even if the MN consistency group 2100 does not include the logical group 440 including the migration destination volume 2103 in the primary storage system or the logical group 440 including the migration destination volume 2104 in the secondary storage system, the present invention is applicable by executing the processes similar to the second embodiment. That is, after step 2708 of FIG. 27, the process equivalent to step 2501 of FIG. 24 may be executed, and after step 2710 of FIG. 27, the processes equivalent to steps 2502 to 2504 of FIG. 24 may be executed.

In FIG. 26 example and FIG. 27 example, a remote copy mode between the migration source volume 2101 in the primary storage system and the migration destination volume 2103 in the primary storage system, and a remote copy mode between the migration source volume 2102 in the secondary storage system and the migration destination volume 2104 in the secondary storage system are both synchronous remote copy. This is not restrictive, and the present invention can be surely implemented with asynchronous remote copy. An exemplary process in such a case is described below with only differences from the above-described examples with the synchronous remote copy.

In steps 2701 and 2702 of FIG. 27, first of all, a command is issued to define and form an asynchronous remote copy pair between the migration source volume 2101 in the primary storage system and the migration destination volume 2103 in the primary storage system, and another asynchronous remote copy pair between the migration source volume 2102 in the secondary storage system and the migration destination volume 2104 in the secondary storage system. In step 2703, the management software 214 waits until the asynchronous remote copy pairs thus defined in steps 2701 and 2702 both transit Duplex in pair state.

In step 2706, the management software 214 first issues a command to put, to Suspend, the pair state of the asynchronous remote copy pair between the migration source volume 2101 in the primary storage system and the migration destination volume 2103 in the primary storage system.

After accepting such a command, in the first primary storage system 120, the data transfer program 722 performs data transfer to the second primary storage system 120. Here, transferred is the not-yet-transferred updated data 600 relating to the migration source volume 2101 in the primary storage system stored in the updated data storage unit 426 in the first primary storage system 120. After the not-yet-transferred updated data 600 is transferred from the first primary storage system 120 to the second primary storage system 120, the first primary storage system 120 forwards the empty updated data 600 (not including the write data 320 or others) indicating a Suspend command so that the second primary storage system 120 is notified of Suspend. Thereafter, the first primary storage system 120 puts, to Suspend, the pair state of the asynchronous remote copy pair found in the PAIR configuration table 422. When the second primary storage system detect such empty updated data 600 indicating the Suspend command, the second primary storage system 120 puts, to Suspend, the pair state of the asynchronous remote copy pair found in the PAIR configuration table 422. To update the PAIR configuration table 422, the remote copy information change program 730 in each of the storage systems is in charge. By executing the above-described process, the asynchronous remote copy pair is changed in pair state into Suspend.

Through reference to the PAIR configuration table 422 for the first and second primary storage systems 120 over the management network 150, the management software 214 checks whether the asynchronous remote copy pair between the migration source volume 2101 in the primary storage system and the migration destination volume 2103 in the primary storage system is Suspend in pair state. After checking that the pair state is in Suspend, the management software 214 issues a command to delete the asynchronous remote copy pair.

In step 2707, the process similar to the above-described step 2706 is executed against the asynchronous remote copy pair between the migration source volume 2102 in the secondary storage system and the migration destination volume 2104 in the secondary storage system.

The remaining process is similar to the case for synchronous remote copy.

Fourth Embodiment

In a fourth embodiment, in the asynchronous remote copy pair migration process described by referring to FIGS. 22, 24, and 27 in the first to third embodiments, an execution trigger is described. The process for asynchronous remote copy pair migration may be executed in response to a trigger provided by a system administrator to the management software 214. Here, the management software 214 is to be run on a storage system or a management computer. This is not the only option, and the following timings may be regarded as an execution trigger.

1. Trigger Based on the Number of I/O Requests

The migration process can be executed to the volume 442 in the primary storage system 120 based on the number of I/O requests issued by the primary host 110. That is, the primary storage systems 120 each monitor the number of I/O requests directed to its own volume 422 in a certain period of time. The monitoring result is notified to the management software 214, i.e., the management software 214 in the host, the management software 214 in the management computer, or the management software 214 of its own. The management software 214 checks whether the notified monitoring result is exceeding a predetermined threshold value, and when exceeding, an asynchronous remote copy pair whose source volume is the volume 422 in the threshold-value-exceeding primary storage system 120 is subjected to the migration process described in the first to third embodiments.

By the management software 214 determining whether or not to execute the migration process for the primary storage system 120 based on the number of I/O requests, the load for the I/O request process in the storage system can be balanced.

Note that, in the below, a trigger for the migration process is presumed as determined by the management software 214 based on the information notified by the storage system and the threshold value as above. Alternatively, the primary storage system 120 may make such a determination using information derived for its own, the threshold value, and the monitoring result, and notify the management software 214 whether or not to start executing the migration process. Still alternatively, the management software 214 may access the storage system on a regular basis for information acquisition, and based on thus acquired information and the threshold value, determine whether or not to execute the migration process. Such possible variations are applicable also to other triggers which will be described below.

2. Trigger Based on Amount of Updated Data

The migration process may also be executed based on the amount of updated data 600 stored in the updated data storage unit 426 in the primary storage system 120. That is, the primary storage systems 120 each notify the amount of updated data 600 stored in its updated data storage unit 426 to the management software 214. The management software 214 then determines whether or not thus notified data amount is exceeding a predetermined threshold value. When exceeding, the migration process is started for an asynchronous remote copy pair whose source volume is the volume included in the threshold-value-exceeding primary storage system 120.

In this method, the load for the asynchronous remote copy process in the storage system can be balanced.

3. Trigger Based on Load of CPU 121

The migration process may also be executed based on the load of the CPU 121 in the storage system. That is, the storage systems may each acquire the CPU Utilization for notification to the management software 214. The management software 214 then determines whether or not thus notified availability factor is exceeding a predetermined threshold value. When exceeding, the management software 214 starts the migration process for an asynchronous remote copy pair whose source or destination volume is the volume included in the threshold-value-exceeding primary storage system 120.

In this method, the load for the CPU 121 in the storage system can be balanced.

4. Trigger Based on the Number of Volumes in Logical Group 440

The migration process may also be executed based on the number of volumes 442 in the logical group 440. That is, the storage systems may each notify the number of volumes 442 in its own logical group 440 to the management software 214. The management software 214 then determines whether or not there is any logical group 440 including more volumes than a predetermined threshold value. When there is some logical group 440 including more volumes than the predetermined threshold value, the management software 214 starts the migration process for an asynchronous remote copy pair whose source or destination volume is the volume 442 in the threshold-value-exceeding logical group 440.

In this method, the volumes 442 in the logical group 440 can be limited in number, and thus the load caused by access process can be balanced among the logical group 440 units.

5. Trigger Based on the Operating Conditions of Power Supply

The migration process may also be executed based on the operating conditions of power supply in the storage system. The storage system generally has redundant power supply. Therefore, with the redundant power supply, when only one power supply is available due to failure or others occurred to the other power supply, migrated is an asynchronous remote copy pair whose source or destination volume is the volume 442 in the storage system.

To be specific, the storage system checks the operating conditions of the power supply of its own, and notifies the check result to the management software 214. The management software 214 refers to thus notified information to determine whether there is any storage system in which only one power supply is available. If yes, the migration process is started for an asynchronous remote copy pair whose source or destination volume is the volume 442 in thus found storage system.

In this method, to a storage system in which one power supply is not working due to failure or others, an asynchronous remote copy pair whose source or destination volume is the storage system can be migrated before the other power supply stops its operation, leading to higher durability against power failure.

6. Trigger Based on Memory Condition

The migration process may also be executed based on the condition of the memory 122 in the storage system. The storage system generally has redundant memory 122. Therefore, with the redundant memory 122, when only one memory is available due to failure or others occurred to the other memory, migrated is an asynchronous remote copy pair whose source or destination volume is the volume 442 in the storage system.

To be specific, the storage system checks the operating conditions of the memory 122 of its own, and notifies the check result to the management software 214. The management software 214 refers to the notified information to determine whether or not there is any storage system in which the memory 122 is not redundant (only one memory is operating) due to failure or others. If yes, the migration process is started for an asynchronous remote copy pair whose source or destination volume is the volume 442 in thus found storage system.

In this method, to a storage system in which a failure or others is occurring to one memory 122, an asynchronous remote copy pair whose source or destination volume is the storage system can be migrated before the other memory 122 stops its operation, leading to higher durability against memory failure.

Herein, as to a threshold value for use to determine whether or not to execute the migration process, the management software 214 is in charge of the setting based on user inputs.

Fifth Embodiment

In the first to third embodiments, the write request 300 issued by the host includes the write time 310. This thus helps a storage system grasp the data write sequence among the write requests 300 issued by various many storage systems. The issue here is that some host does not provide the write request 300 with the write time 310. In view thereof, in a fifth embodiment, described is a method of assuring the data-write-sequence consistency over a plurality of storage systems even if such a host(s) as not providing the write request 300 with the write time 310 are included in the information processing system.

Figure 29:
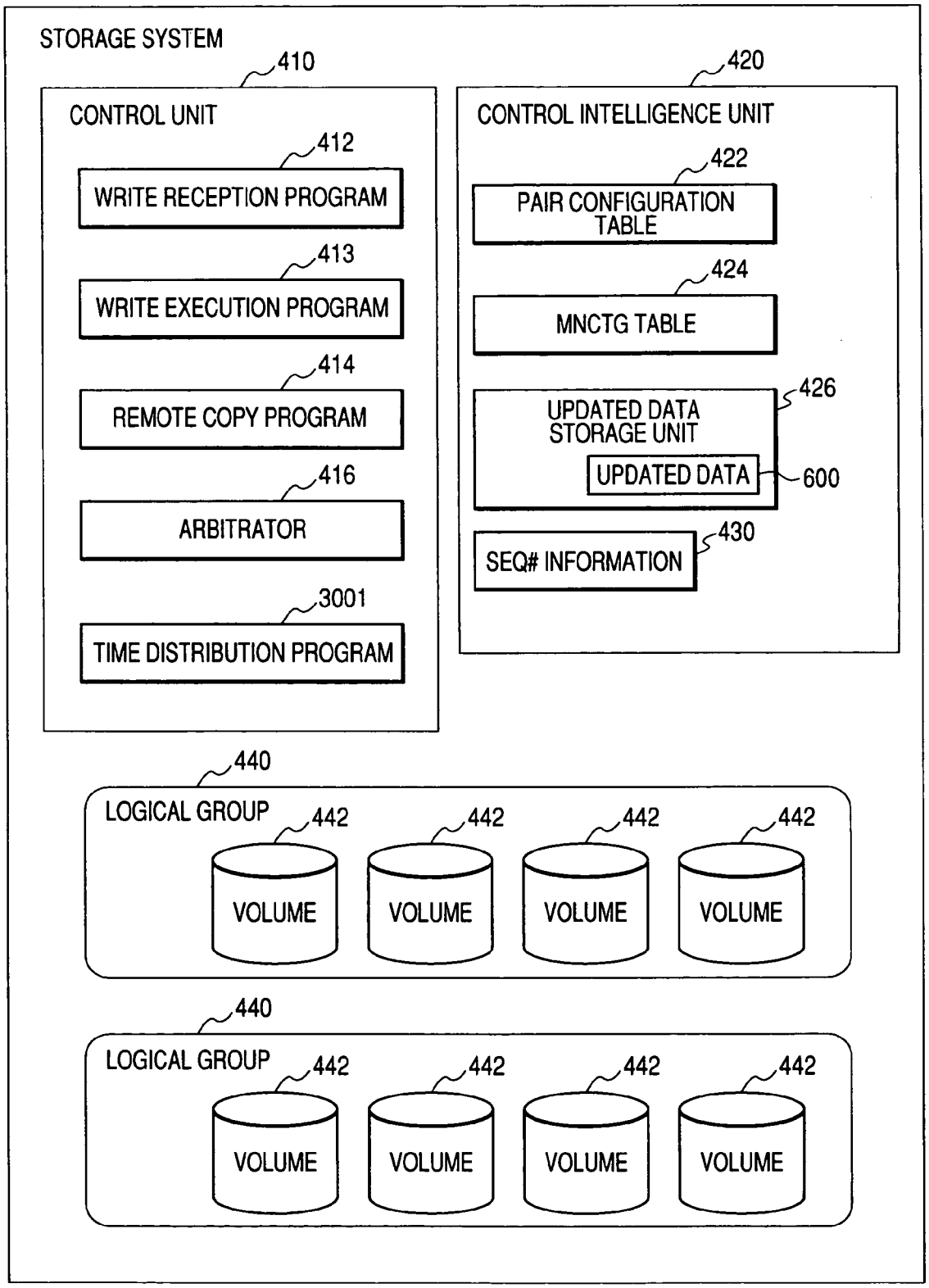
FIG. 29 is a diagram showing another exemplary structure of a storage system.

FIG. 29 is a diagram showing another exemplary storage system. The difference with the storage system of FIG. 4 is that the storage system includes a time distribution program 3001 in the control unit 410. Similarly to the arbitrator 416, the time distribution program 3001 has a one-to-one relationship with the MN consistency group for operation, and may operate in any of a plurality of primary storage systems 120 and a plurality of secondary storage systems 130, each having the volume 442 belonging to the MN consistency group.

In the below, an exemplary process for the time distribution program 3001 is described.

The time distribution program 3001 is in charge of time assignment on a regular basis to the storage system(s) including the logical group 440 belonging to the MN consistency group.

Step 1: The time distribution program 3001 searches the MNCTG table 424 using the MNCTG ID of its own MN consistency group as a key to find the logical group ID of the logical group 440 belonging to the MN consistency group, and the ID of the storage system including the logical group 440.

Step 2: The time distribution program 3001 then issues a message to the storage system including such a logical group 440. The message is telling temporarily to hold the process for the write request 300 directed to the volume 442 in the logical group 440 indicated by the logical group ID derived in step 1.

Step 3: The time distribution program 3001 waits for a response from the storage system to which the message is issued to hold the process for the write request 300.

Step 4: After receiving the response from the storage system, the time distribution program 3001 distributes time information to the storage system indicated by the storage system ID derived in step 1. Here, the time information may indicate the actual time, or the logical time, i.e., information such as sequential number telling which is larger between this time information and the one provided by the time distribution program 3001 before. The same-value time information is directed to each of the storage systems.

Step 5: To the storage system indicated by the storage system ID derived in step 1, a message is issued to resume the process for the write request 300 directed to the volume 422 in the logical group 440 indicated by the logical group ID derived in step 1.

Described next is an exemplary process for the storage system received the time information from the time distribution program 3001. Considered here is a case where the storage system receives a time A from the time distribution program 3001 as the time information. In this case, after receiving the write request 300 from the host, the storage system provides the write request 300 with the time A that is received from the time distribution program 3001 as the write time 320. This process is executed after step 901 but before 902 of FIG. 10 by the write reception program 412. Until a new time receives from the time distribution program 3001, the storage systems each keep providing the write request 300 with the time A. Once a time B newly receives from the time distribution program 3001, the write time 320 is changed to the time B for provision to the write request 300.

Thereafter, in the storage systems, the time information distributed by the time distribution program 3001 is used as the write time 320 so that the processes of the first to third embodiments are executed.

As such, to process the write request 300 for the volume 442 in the MN consistency group, using the time information provided by the time distribution program 3001 for the logical groups 440 belonging to the same MN consistency group is equivalent to using the time information provided by the time distribution program 3001 as a synchronous point among the logical groups in the MN consistency group. Accordingly, using such a synchronous point enables to assure the data-write-sequence consistency in the MN consistency group.

Further, by using the time information provided by the time distribution program 3001 as the write time 320, even if the write request 300 issued by the host without the write time 320, the processes similar to those in the first to third embodiments can be executed, thereby enabling the process for asynchronous remote copy pair migration.

What we claim:

1. A migration method of an asynchronous remote copy pair in a system comprising primary site and secondary site,
    wherein the primary site includes a first primary storage system having a plurality of first primary volumes including a source primary volume and a first primary controller controlling the plurality of first primary volumes, and a second primary storage system having a plurality of second primary volumes including a destination primary volume and a second primary controller controlling the plurality of second primary volumes,
    the secondary site includes a first secondary storage system having a plurality of first secondary volumes including a source secondary volume and a first secondary controller controlling the plurality of first secondary volumes, and a second secondary storage system having a plurality of second secondary volumes including a destination secondary volume and a second secondary controller controlling the plurality of second secondary volumes,
    between the primary site and the secondary site, a plurality of asynchronous remote copy pairs of a primary volume and a secondary volume, in which an asynchronous remote copy pair of the source primary volume and the source secondary volume is included, are defined, and
    the first primary controller, the second primary controller, the first secondary controller, and the second secondary controller execute asynchronous remote copy processing for the plurality of asynchronous remote copy pairs to write data in first and second secondary volumes based on an order of write requests issued for first and second primary volumes,
    the migration method comprising steps of:
    a first copying step for copying data stored in the source primary volume to the destination primary volume;
    a second copying step for copying data stored in the source primary volume to the destination secondary volume via one of the second primary storage system or the first secondary storage system to define an asynchronous remote copy pair between the destination primary volume and the destination secondary volume;
    an I/O destination change step for changing destination of an I/O request from the source primary volume to the destination primary volume; and
    an asynchronous remote copy processing step for executing asynchronous remote copy processing for the defined asynchronous remote copy pair between the destination primary volume and the destination secondary volume and the plurality of asynchronous remote copy pairs, and writing data in the first secondary volumes and the second secondary volumes including the destination secondary volume based on an order of write requests issued for the first primary volumes and second primary volumes including the destination primary volume, whereby the asynchronous remote copy pair between the source primary volume and the source secondary volume is migrated to the asynchronous remote copy pair between the destination primary volume and destination secondary volume.

2. A migration method according to claim 1, wherein after the I/O destination change step, the asynchronous remote copy pair between the source primary volume and the source secondary volume is released.

3. A migration method according to claim 1, wherein:
the first copying step includes a step for defining a synchronous remote copy pair between the source primary volume and the destination primary volume, and a step for executing first initial copy processes for the defined synchronous remote copy pair, and
the second copying step includes a step for defining an asynchronous remote copy pair between the destination primary volume and the destination secondary volume after finishing the first initial copy processes, and a step for executing second initial copy processes for the defined asynchronous remote copy pair.

4. A migration method according to claim 3, further comprising steps of:
a stop I/O request step for stopping issuing I/O requests to the source primary volume after finishing the second initial copy processes; and
a synchronous remote copy pair releasing step for releasing the synchronous remote copy pair defined between the source primary volume and the destination primary volume after the stop I/O request step,
wherein after the synchronous remote copy pair releasing step, the I/O destination change step is executed and a computer coupled to the first primary storage system and the second primary storage system starts to issue I/O requests to the destination primary volume instead of the source primary volume.

5. A migration method according to claim 4, wherein after the I/O destination change step, the asynchronous remote copy pair between the source primary volume and the source secondary volume is released.

6. A migration method according to claim 1, wherein:
the first copying step includes a step for defining an asynchronous remote copy pair between the source primary volume and the destination primary volume, and a step for executing first initial copy processes for the defined asynchronous remote copy pair, and
the second copying step includes a step for defining an asynchronous remote copy pair between the destination primary volume and the destination secondary volume after finishing the first initial copy processes, and a step for executing second initial copy processes for the defined asynchronous remote copy pair.

7. A migration method according to claim 6, further comprising steps of:
a stop I/O request step for stopping issuing I/O requests to the source primary volume after finishing the second initial copy processes;
a write data sending step for sending write data, which is written to the source primary volume and has not been sent to the destination primary volume, to the destination primary volume, after the stop I/O request step;
an asynchronous remote copy pair releasing step for releasing the asynchronous remote copy pair defined between the source primary volume and the destination primary volume after the write data sending step,
wherein after the asynchronous remote copy pair releasing step, the I/O destination change step is executed and a computer coupled to the first primary storage system and the second primary storage system starts to issue I/O requests to the destination primary volume instead of the source primary volume.

8. A migration method according to claim 4, wherein: a consistency group including a plurality of primary volumes and a plurality of secondary volumes is defined, for the plurality of asynchronous remote copy pairs of a primary volume and a secondary volume, both of which are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and
the source primary volume, the destination primary volume, the source secondary volume, and the destination secondary volume are included in a same consistency group.

9. A migration method according to claim 4, wherein a consistency group including a plurality of primary volumes and a plurality of secondary volumes is defined, for the plurality of asynchronous remote copy pairs of a primary volume and a secondary volume, both of which are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and
the migration method further comprising a step of:
adding the destination primary volume and the destination secondary volume to a consistency group including the source primary volume and the source secondary volume, after the finish of the second initial copy processes.

10. A migration method according to claim 1, wherein:
the first copying step includes a step for defining a synchronous remote copy pair between the source primary volume and the destination primary volume, and a step for executing first initial copy processes for the defined synchronous remote copy pair,
the second copying step includes a step for defining a synchronous remote copy pair between the source secondary volume and the destination secondary volume, and a step for executing second initial copy processes for the defined synchronous remote copy pair, and
wherein the asynchronous remote copy pair between the destination primary volume and the destination secondary volume is defined and a status of the asynchronous remote copy pair between the destination primary volume and the destination secondary volume transits a duplex state without initial copy processes.

11. A migration method according to claim 10, further comprising steps of:
a stop I/O request step for stopping issuing I/O requests to the source primary volume after finishing the second initial copy processes;
an asynchronous remote copy pair state changing step for changing a state of the asynchronous remote copy pair between the source primary volume and the source secondary volume to a suspend state; and
a synchronous remote copy pair releasing step for releasing the synchronous remote copy pairs between the source primary volume and the destination primary volume and between the source secondary volume and the destination secondary volume, after the state of the asynchronous remote copy pair between the source primary volume and the source secondary volume transits the suspend state, wherein after the synchronous remote copy pair releasing step, the asynchronous remote copy pair between the destination primary volume and the destination secondary volume is defined and the destination of the I/O requests is changed from the source primary volume to the destination primary volume.

12. A migration method according to claim 1, wherein:

the first copying step includes a step for defining an asynchronous remote copy pair between the source primary volume and the destination primary volume, and a step for executing first initial copy processes for the defined asynchronous remote copy pair, the second copying step includes a step for defining an asynchronous remote copy pair between the source secondary volume and the destination secondary volume, and a step for executing second initial copy processes for the defined asynchronous remote copy pair, and wherein the asynchronous remote copy pair between the destination primary volume and the destination secondary volume is defined and a status of the asynchronous remote copy pair between the destination primary volume and the destination secondary volume transits a duplex state without initial copy processes.

13. A migration method according to claim 12, further comprising steps of:

a stop I/O request step for stopping issuing I/O requests to the source primary volume after finishing the second initial copy processes;

an asynchronous remote copy pair state changing step for changing a state of the asynchronous remote copy pair between the source primary volume and the source secondary volume to a suspend state;

an asynchronous remote copy pair releasing step for releasing the asynchronous remote copy pairs between the source primary volume and the destination primary volume and between the source secondary volume and the destination secondary volume, after the state of the asynchronous remote copy pair between the source primary volume and the source secondary volume transits the suspend state, wherein after the asynchronous remote copy pair releasing step, the asynchronous remote copy pair between the destination primary volume and the destination secondary volume is defined and the destination of the I/O requests is changed from the source primary volume to the destination primary volume.

14. A migration method according to claim 11, wherein a consistency group including a plurality of primary volumes and a plurality of secondary volumes is defined, for the plurality of asynchronous remote copy pairs of a primary volume and a secondary volume, both of which are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and the source primary volume, the destination primary volume, the source secondary volume, and the destination secondary volume are included in a same consistency group.

15. A migration method according to claim 11, wherein a consistency group including a plurality of primary volumes and a plurality of secondary volumes is defined, for the plurality of asynchronous remote copy pairs of a primary volume and a secondary volume, both of which are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and the migration method further comprising a step of:

adding the destination primary volume and the destination secondary volume to a consistency group including the source primary volume and the source secondary volume, after the asynchronous remote copy pair between the destination primary volume and the destination secondary volume is defined.

16. A computer program product for migrating an asynchronous remote copy pair in a system comprising primary site and secondary site, wherein the primary site includes a first primary storage system having a plurality of first primary volumes including a source primary volume and a first primary controller controlling the plurality of first primary volumes, and a second primary storage system having a plurality of second primary volumes including a destination primary volume and a second primary controller controlling the plurality of second primary volumes, wherein the secondary site includes a first secondary storage system having a plurality of first secondary volumes including a source secondary volume and a first secondary controller controlling the plurality of first secondary volumes, and a second secondary storage system having a plurality of second secondary volumes including a destination secondary volume and a second secondary controller controlling the plurality of second secondary volumes, between the primary site and the secondary site, a plurality of asynchronous remote copy pairs of a primary volume and a secondary volume, in which an asynchronous remote copy pair of the source primary volume and the source secondary volume is included, are defined, and the first primary controller, the second primary controller, the first secondary controller, and the second secondary controller execute asynchronous remote copy processing for the plurality of asynchronous remote copy pairs to write data in first secondary volumes and second secondary volumes based on an order of write requests issued for first primary volumes and second primary volumes, the computer program product comprising:

a recording medium;

a code, recorded in the recording medium, that causes a computer to instruct the first primary storage system and the second primary storage system to define a remote copy pair between the source primary volume and the destination primary volume;

a code, recorded in the recording medium, that causes a computer to check a state of the remote copy pair between the source primary volume and the destination primary volume and wait until the state of the remote copy pair between the source primary volume and the destination primary volume transits duplex state;

a code, recorded in the recording medium, that causes a computer to instruct the second primary storage system and the second secondary storage to define an asynchronous remote copy pair between the destination primary volume and the destination secondary volume;

a code, recorded in the recording medium, that causes a computer to check a state of the asynchronous remote copy pair between the destination primary volume and the destination secondary volume and wait until the state of the asynchronous remote copy pair between the destination primary volume and the destination secondary volume transits duplex state;

a code, recorded in the recording medium, that causes a computer to instruct a host computer coupled to the first primary storage system and the second primary storage system to stop issuing an I/O request;

a code, recorded in the recording medium, that causes a computer to instruct the first primary storage system and the second primary storage system to release the remote copy pair between the source primary volume and the destination primary volume;

a code, recorded in the recording medium, that causes a computer to instruct the host computer to change a destination of I/O requests from the source primary volume to the destination primary volume; and a code, recorded in the recording medium, that causes a computer to instruct the first primary storage system and the first secondary storage system to release the asynchronous remote copy pair between the source primary volume and the source secondary volume.

17. A computer program product according to claim 16, wherein a consistency group including a plurality of primary volumes and a plurality of secondary volumes is defined, for the plurality of asynchronous remote copy pairs, whose primary volumes and secondary volumes are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and the source primary volume, the destination primary volume, the source secondary volume, and the destination secondary volume are included in a same consistency group.

18. A computer program product according to claim 16, wherein a consistency group including a plurality of primary volumes and a plurality of secondary volumes is defined, for the plurality of asynchronous remote copy pairs, whose primary volumes and secondary volumes are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and the computer program product further comprising:

a code, recorded in the recording medium, that causes a computer to add the destination primary volume and the destination secondary volume to a consistency group including the source primary volume and the source secondary volume, after the asynchronous remote copy pair between the destination primary volume and the destination secondary volume is defined.

19. A computer program product for migrating an asynchronous remote copy pair in a system comprising primary site and secondary site, wherein the primary site includes a first primary storage system having a plurality of first primary volumes including a source primary volume and a first primary controller controlling the plurality of first primary volumes, and a second primary storage system having a plurality of second primary volumes including a destination primary volume and a second primary controller controlling the plurality of second primary volumes, the secondary site includes a first secondary storage system having a plurality of first secondary volumes including a source secondary volume and a first secondary controller controlling the plurality of first secondary volumes, and a second secondary storage system having a plurality of second secondary volumes including a destination secondary volume and a second secondary controller controlling the plurality of second secondary volumes, between the primary site and the secondary site, a plurality of asynchronous remote copy pairs of a primary volume and a secondary volume, in which an asynchronous remote copy pair of the source primary volume and the source secondary volume is included, are defined, and the first primary controller, the second primary controller, the first secondary controller, and the second secondary controller execute asynchronous remote copy processing for the plurality of asynchronous remote copy pairs to write data in first secondary volumes and second secondary volumes based on an order of write requests issued for first primary volumes and second primary volumes, the computer program product comprising:

a recording medium;

a code, recorded in the recording medium, that causes a computer to instruct the first primary storage system and the second primary storage system to define a remote copy pair between the source primary volume and the destination primary volume;

a code, recorded in the recording medium, that causes a computer to instruct the first secondary storage system and the second secondary storage system to define a remote copy pair between the source secondary volume and the destination secondary volume;

a code, recorded in the recording medium, that causes a computer to check a state of the remote copy pair between the source primary volume and the destination primary volume and the remote copy pair between the source secondary volume and the destination secondary volume;

a code, recorded in the recording medium, that causes a computer to instruct a host computer coupled to the first primary storage system and the second primary storage system to stop issuing an I/O request after the state of the remote copy pair between the source primary volume and the destination primary volume and the state of the remote copy pair between the source secondary volume and the destination secondary volume transit duplex state;

a code, recorded in the recording medium, that causes a computer to instruct the first primary storage system to make the state of the asynchronous remote copy pair between the source primary volume and the source secondary volume suspended state;

a code, recorded in the recording medium, that causes a computer to instruct the first primary storage system and the second primary storage system to release the remote copy pair between the source primary volume and the destination primary volume;

a code, recorded in the recording medium, that causes a computer to instruct the first secondary storage system and the second secondary storage system to release the remote copy pair between the source secondary volume and the destination secondary volume;

a code, recorded in the recording medium, that causes a computer to instruct the second primary storage system and the second secondary storage system to define an asynchronous remote copy pair between the destination primary volume and the destination secondary volume, and make the state of the asynchronous remote copy pair between the destination primary volume and the destination secondary volume duplex without initial copying processes;

a code, recorded in the recording medium, that cause a computer to instruct the host computer to change a destination of I/O requests from the source primary volume to the destination primary volume; and a code, recorded in the recording medium, that causes a computer to instruct the first primary storage system and the first secondary storage system to release the asynchronous remote copy pair between the source primary volume and the source secondary volume.

20. A computer program product according to claim 19, wherein a consistency group including a plurality of primary volumes and a plurality of secondary volumes is defined, for the plurality of asynchronous remote copy pairs, whose primary volumes and secondary volumes are included in the same consistency group, the first primary controller, the second primary controller, the first secondary controller, and the second secondary controller execute asynchronous remote copy processes to write data in first secondary volumes and second secondary volumes based on an order of write requests issued for first primary volumes and second primary volumes, and the computer program product further comprising:

a code, recorded in the recording medium, that causes a computer to add the destination primary volume and the destination secondary volume to a consistency group including the source primary volume and the source secondary volume, after the asynchronous remote copy pair between the destination primary volume and the destination secondary volume is defined.

* * * * *